(12) United States Patent
Sambonsugi

(10) Patent No.: US 8,792,033 B2
(45) Date of Patent: Jul. 29, 2014

(54) IMAGE PICKUP APPARATUS CAPABLE OF CHANGING OPERATION CONDITION OF IMAGE SENSING DEVICE AND CONTROL METHOD THEREFOR

(75) Inventor: Hideaki Sambonsugi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 51 days.

(21) Appl. No.: 13/549,856

(22) Filed: Jul. 16, 2012

(65) Prior Publication Data

US 2013/0021510 A1     Jan. 24, 2013

(30) Foreign Application Priority Data

Jul. 21, 2011  (JP) .................................. 2011-159924
May 28, 2012  (JP) .................................. 2012-120584

(51) Int. Cl.
*H04N 3/14*  (2006.01)
*H04N 5/335*  (2011.01)

(52) U.S. Cl.
USPC ........................................................ 348/302

(58) Field of Classification Search
USPC ................... 348/294, 302, 308; 250/208.1
See application file for complete search history.

(56) References Cited

U.S. PATENT DOCUMENTS

2011/0260038 A1* 10/2011 Hirotsu et al. ............. 250/208.1
2012/0199726 A1*  8/2012 Koizumi ..................... 250/208.1
2012/0312964 A1* 12/2012 Yamashita et al. ......... 250/208.1

FOREIGN PATENT DOCUMENTS

JP           2000-165754            6/2000

* cited by examiner

*Primary Examiner* — Gevell Selby
(74) *Attorney, Agent, or Firm* — Cowan, Liebowitz & Latman, P.C.

(57) ABSTRACT

An image pickup apparatus capable of ensuring a dynamic range suitable for an image shooting condition and capable of reducing noise. The image pickup apparatus includes an image sensing device having floating diffusion units that are provided corresponding to pixels and that convert electrical charges accumulated in the pixels into voltage signals, which are output as pixel signals from pixel amplifiers. At that time, according to an image shooting condition, at least parts of connection switches corresponding to the floating diffusion units are sequentially turned on or all the connection switches are turned off, whereby the connection switches are connected to or disconnected from connection lines to thereby change capacity components connected to pixel amplifiers. This contributes to dynamic range expansion or noise reduction.

12 Claims, 19 Drawing Sheets

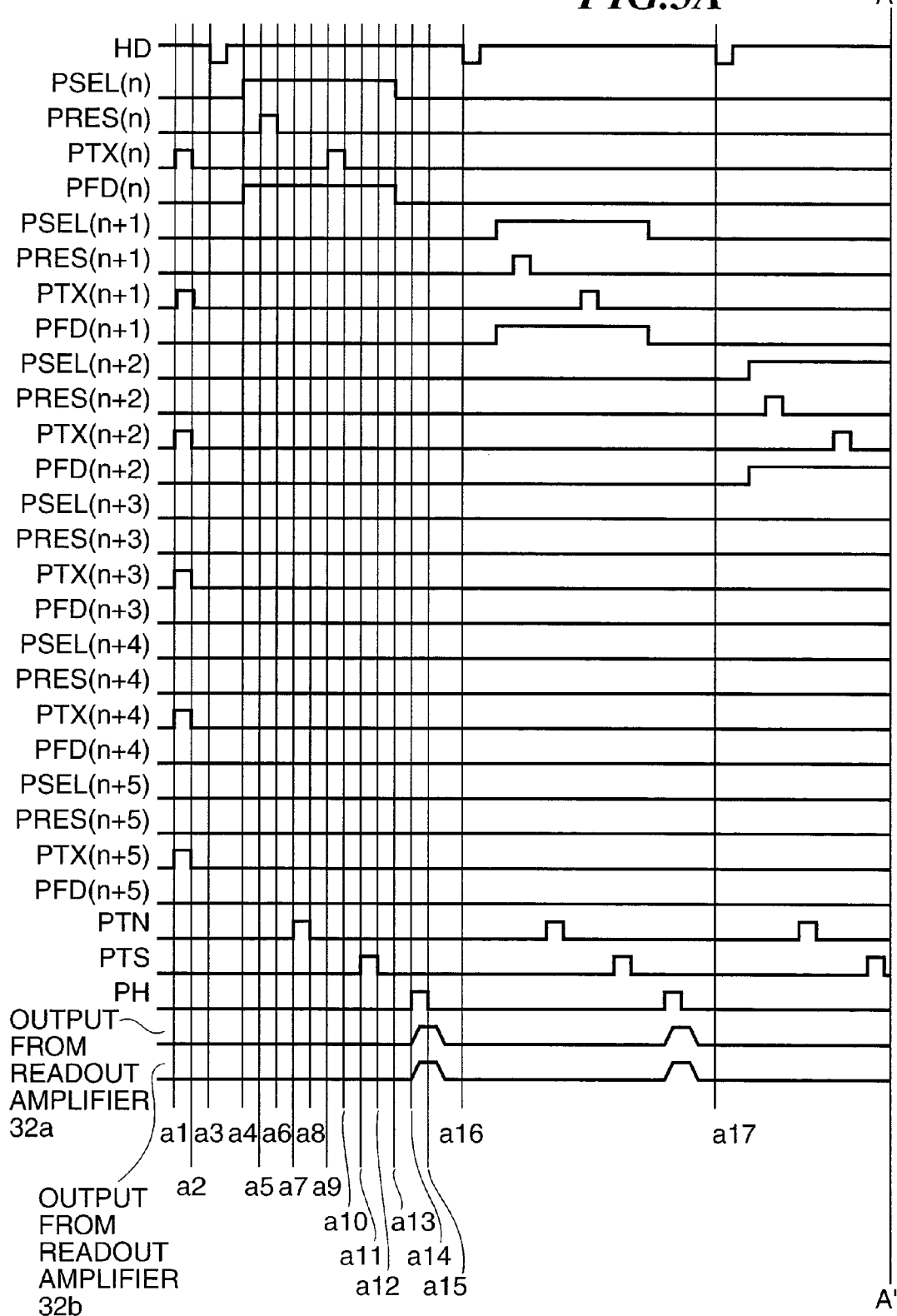

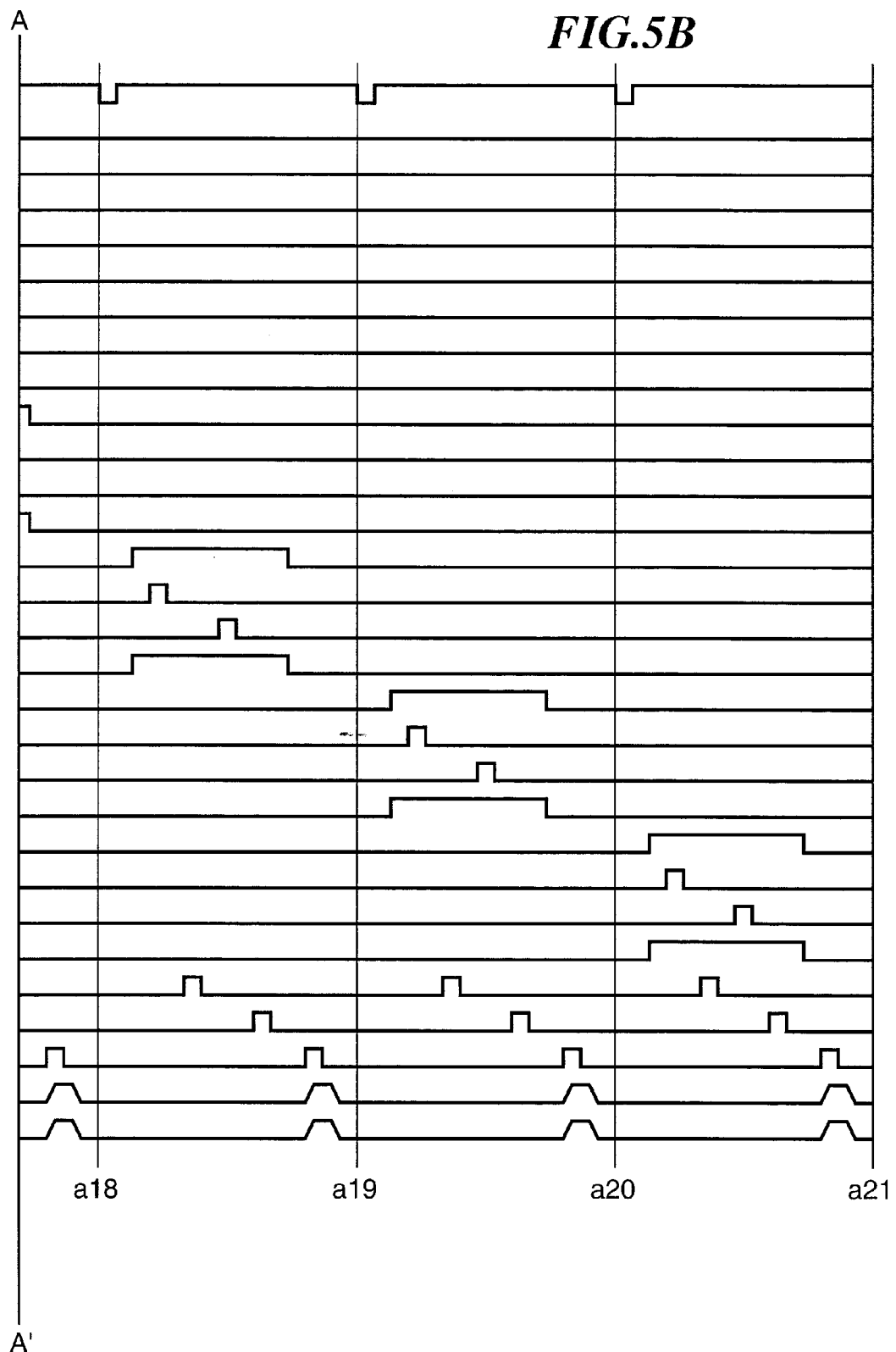

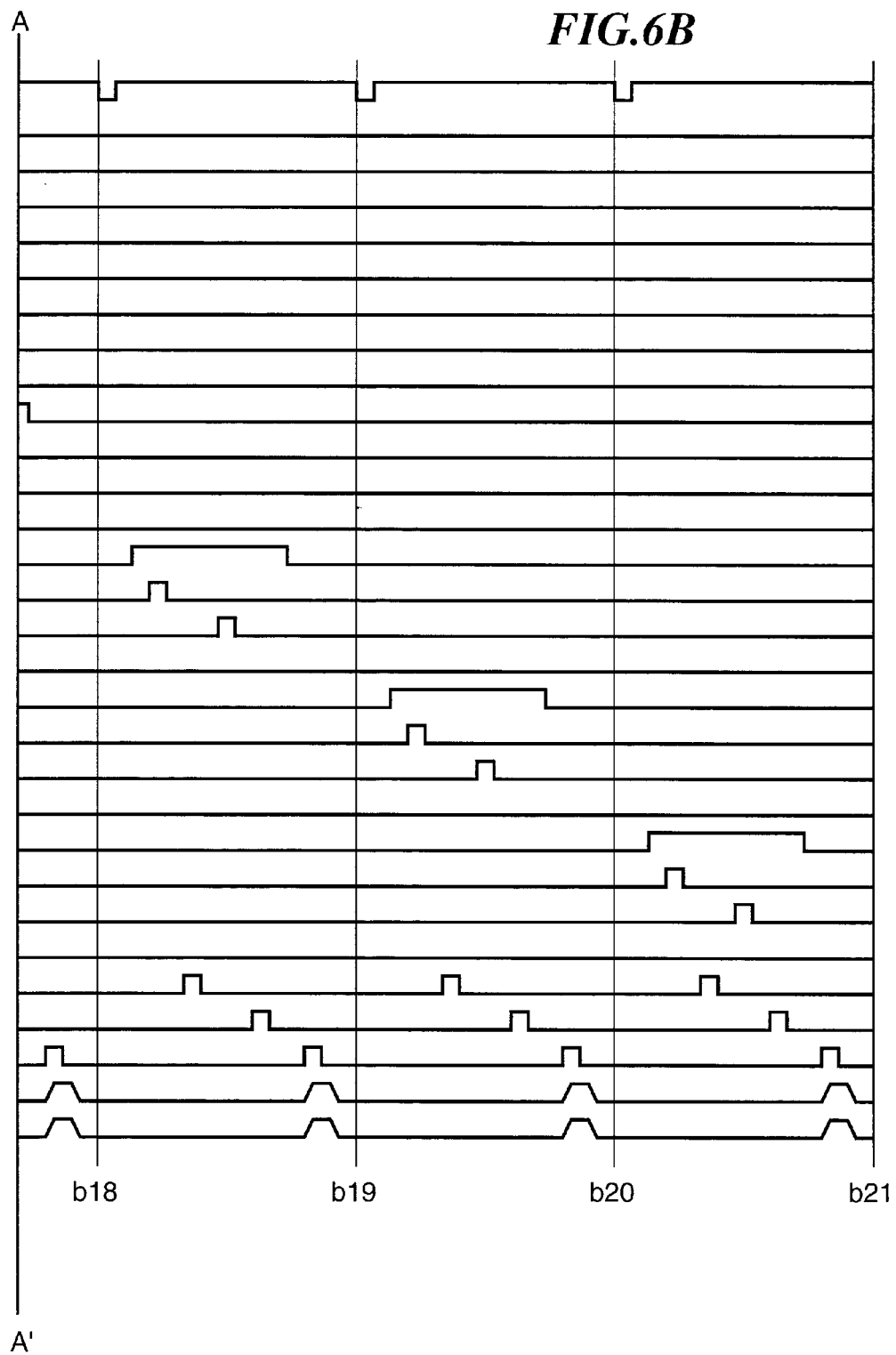

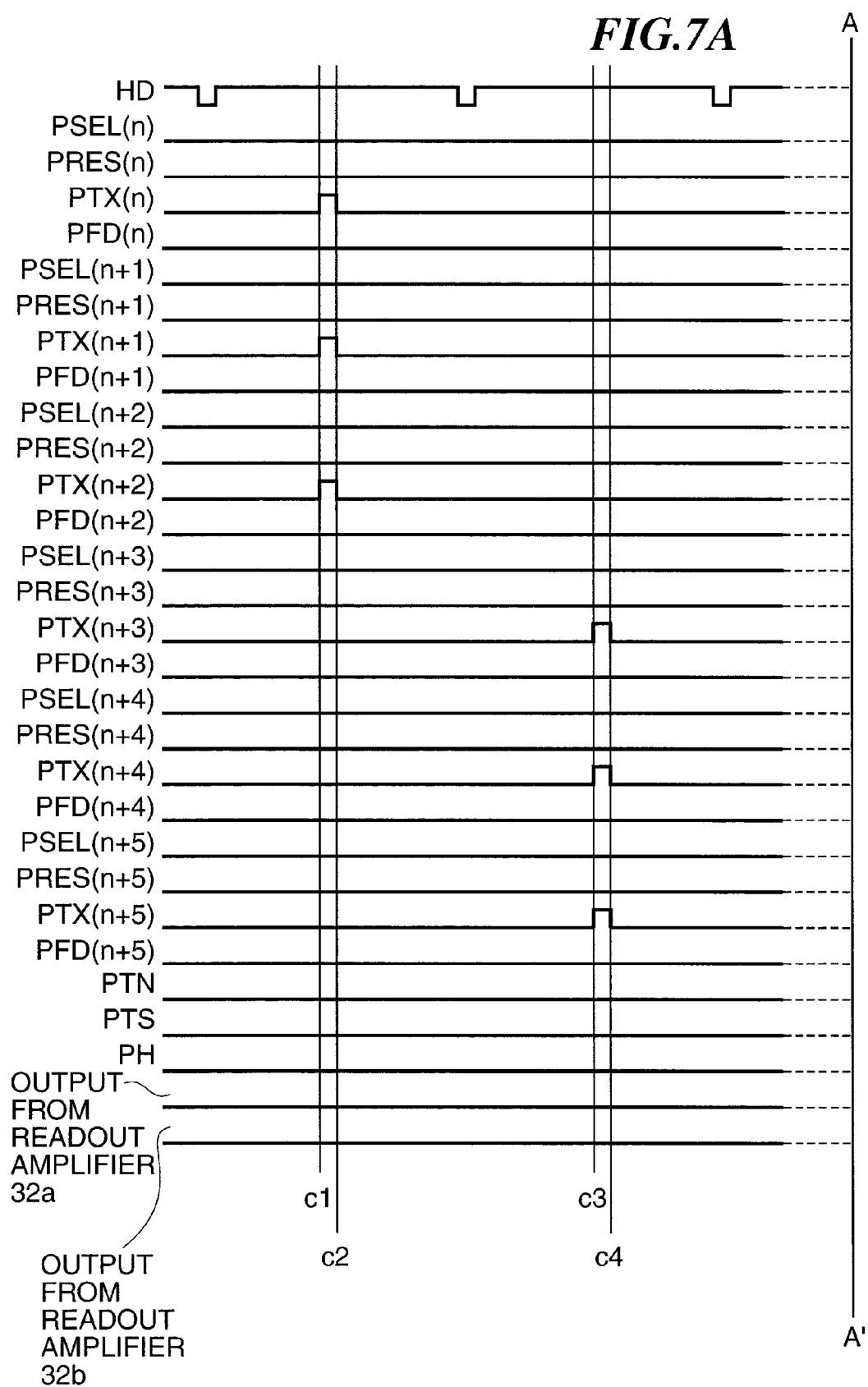

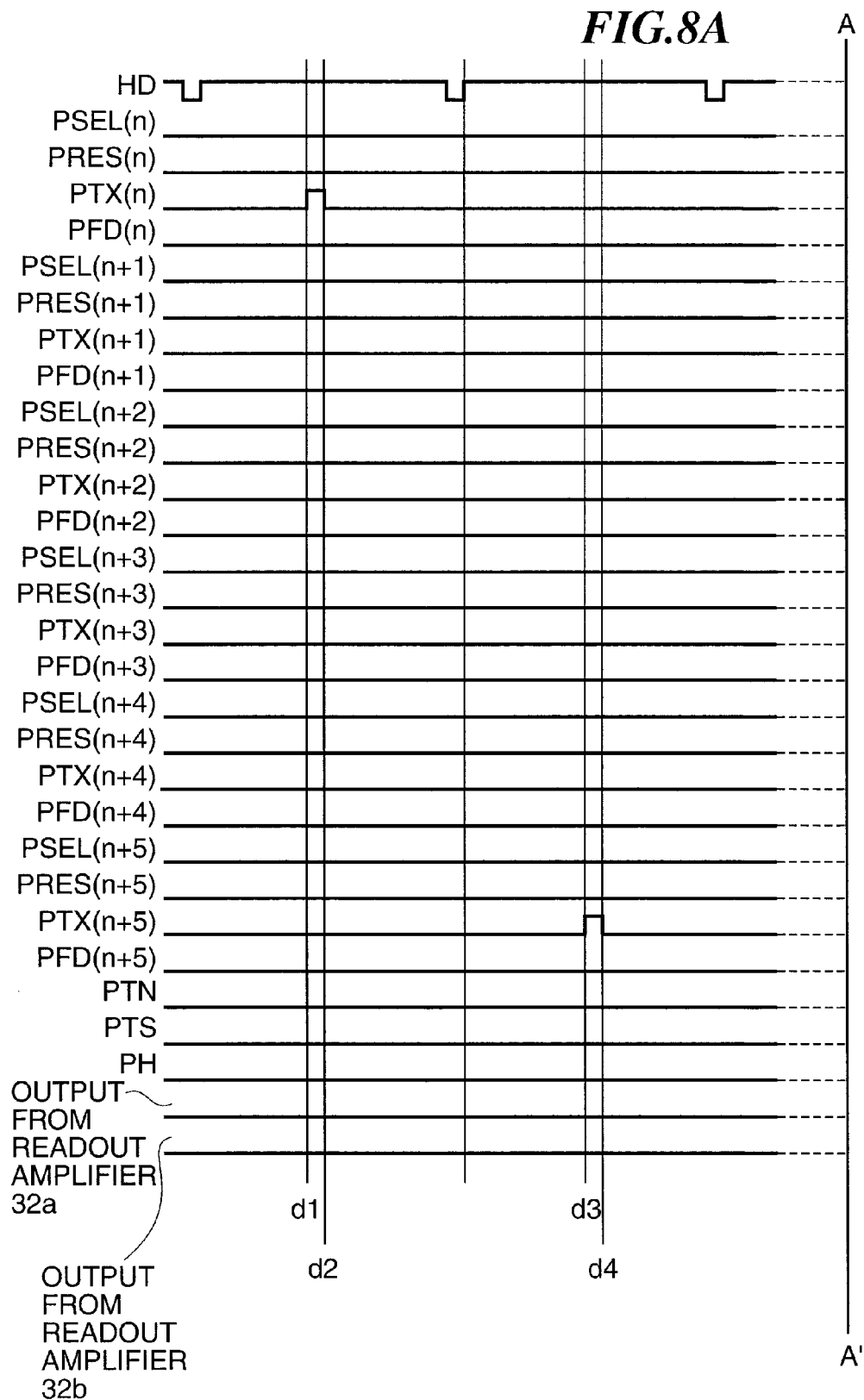

FIG.14

| G11 | B11 | G13 | B12 | G15 | B13 |
|-----|-----|-----|-----|-----|-----|
| R11 | G12 | R12 | G14 | R13 | G16 |
| G11 | B11 | G13 | B12 | G15 | B13 |
| R11 | G12 | R12 | G14 | R13 | G16 |
| G11 | B11 | G13 | B12 | G15 | B13 |
| R11 | G12 | R12 | G14 | R13 | G16 |
| G21 | B21 | G23 | B22 | G25 | B23 |
| R21 | G22 | R22 | G24 | R23 | G26 |
| G21 | B21 | G23 | B22 | G25 | B23 |
| R21 | G22 | R22 | G24 | R23 | G26 |
| G21 | B21 | G23 | B22 | G25 | B23 |
| R21 | G22 | R22 | G24 | R23 | G26 |

IMAGE PICKUP APPARATUS CAPABLE OF CHANGING OPERATION CONDITION OF IMAGE SENSING DEVICE AND CONTROL METHOD THEREFOR

BACKGROUND OF THE INVENTION

1. Field of the Invention

The present invention relates to an image pickup apparatus such as a digital camera and a control method therefor, which are capable of changing an operation condition of an image sensing device according to image shooting condition.

2. Description of the Related Art

Some image pickup apparatus is configured to operate an image sensing device such as a CMOS sensor in an operation condition that varies according to image shooting condition. For example, there is an image pickup apparatus that increases gains of pixel amplifiers of an image sensing device with increase of image shooting sensitivity. To this end, floating diffusion units (hereinafter each referred to as FD) that accumulate electrical charges generated in pixels are each configured to have a small capacity. However, with decrease of the FD capacity, an amount of charge that can be transferred decreases and as result a so-called dynamic range becomes narrow.

To obviate this, there is known an image pickup apparatus that changes the FD capacity by using e.g. a MOS transistor connected to the FD to thereby change the amount of charge that can be held in the FD, thereby expanding the dynamic range (see, Japanese Laid-open Patent Publication No. 2000-165754).

It should be noted that with increase of the FD capacity, not only the dynamic range increases, but also noise increases. On the other hand, the dynamic range becomes narrow with decrease of the FD capacity, as previously described.

According to the image pickup apparatus disclosed in Japanese Laid-open Patent Publication No. 2000-165754, the dynamic range can be expanded, however, it is difficult to reduce noise and expand the dynamic range at the same time. In a case, for example, that pieces of pixel data in the same column are added together, it is difficult to simultaneously achieve dynamic range expansion and noise reduction.

SUMMARY OF THE INVENTION

The present invention provides an image pickup apparatus and a control method therefor, which are capable of ensuring a dynamic range suitable for an image shooting condition and capable of reducing noise.

According to one aspect of this invention, there is provided an image pickup apparatus comprising an image sensing device that includes a plurality of pixels arranged two-dimensionally, a plurality of floating diffusion units provided respectively corresponding to the plurality of pixels and configured to convert electrical charges respectively generated in the plurality of pixels into voltage signals, and a switch unit having connection lines to and from each of which a corresponding at least one of the plurality of floating diffusion units can selectively be connected or disconnected, and a control unit configured to control the switch unit in such a manner that at least parts of the plurality of floating diffusion units are sequentially connected to the connection lines or all the plurality of floating diffusion units are not connected to the connection lines.

With this invention, dynamic range can be ensured irrespective of image shooting condition, and noise can be reduced.

Further features of the present invention will become apparent from the following description of exemplary embodiments with reference to the attached drawings.

BRIEF DESCRIPTION OF THE DRAWINGS

FIGS. 5A and 5B are a timing chart showing operation timings of the image sensing device at low ISO still image shooting;

FIGS. 6A and 6B are a timing chart showing operation timings of the image sensing device at high ISO still image shooting;

FIGS. 7A and 7B are a timing chart showing operation timings of the image sensing device at moving image shooting in high image quality mode;

FIGS. 8A and 8B are a timing chart showing operation timings of the image sensing device at low ISO moving image shooting in high speed mode;

FIG. 14 is a view showing a part of a color filter of primary color Bayer pattern provided in the image pickup apparatus, which is a color image pickup apparatus.

DESCRIPTION OF THE EMBODIMENTS

The present invention will now be described in detail below with reference to the drawings showing preferred embodiments thereof.

First Embodiment

Figure 1:
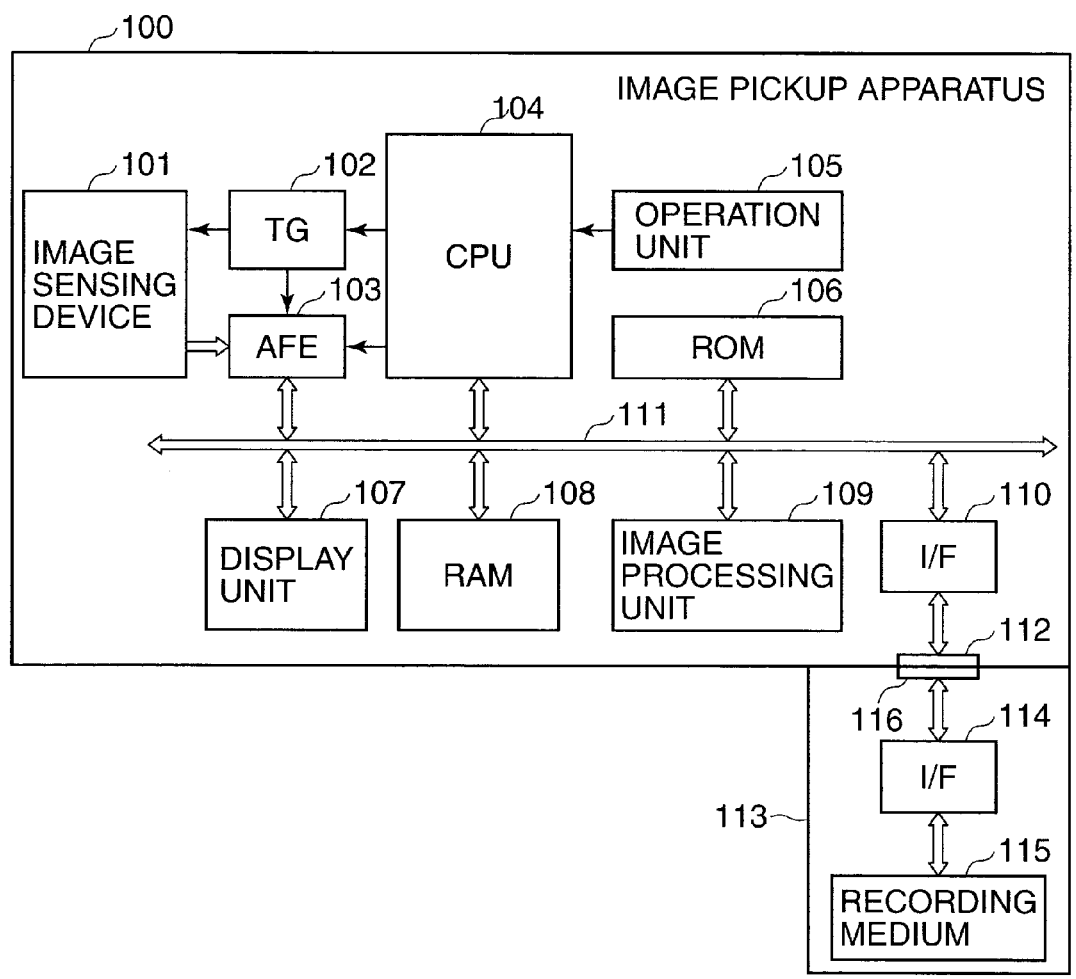
FIG. 1 is a block diagram showing an example of an image pickup apparatus according to a first embodiment of this invention.

FIG. 1 shows in a block diagram an example of an image pickup apparatus according to a first embodiment of this invention.

In FIG. 1, the image pickup apparatus 100, which is a digital camera for example, has a still image shooting function and a moving image shooting function. The image pickup apparatus 100 includes a CPU 104 that overall controls the image pickup apparatus 100, and includes an image sensing device 101 on which an optical image passing through an image shooting lens (not shown) is formed. The image sensing device 101 converts the optical image formed thereon into a series of electrical signals (analog pixel signals).

Analog pixel signals output from the image sensing device 101 are subjected to a gain adjustment in an analog front end (hereinafter referred to as AFE) 103 and then converted by the AFE 103 into digital signals (image data) with a predetermined number of quantization bits. Under the control of the CPU 104, a timing generator (TG) 102 controls operation timings of the image sensing device 101 and operation timings of the AFE 103.

A RAM 108 is an image memory that stores image data output from the AFE 103 and stores image data processed by an image processing unit 109. The RAM 108 is also used as a work memory by the CPU 104. It should be noted that in this example the RAM 108 is used as the image memory and as the work memory, but any other memory having no problem in access speed can be used instead of the RAM 108.

A ROM 106 stores a program that operates on the CPU 104. A flash ROM is used as the ROM 106 in this example, but any other memory having no problem in access speed can be used instead of the flash ROM.

The image processing unit 109 performs correction and compression of a still image and a moving image and performs other processing. An interface unit (I/F) 110 provides an interface with an external recording unit 113.

The external recording unit 113 includes an I/F 114, a recording medium 115, and a connector 116. The recording medium 115 is a nonvolatile memory, a hard disk, or the like and stores image data, etc. The external recording unit 113 is connected via the connector 116 and a connector 112 of the image pickup apparatus 100 to the I/F 110. Reference numeral 111 denotes a bus to which the CPU 104, etc. are connected.

In this example, the recording medium 115 is provided in the external recording unit 113, which is detachably mounted to the image pickup apparatus 100 via the connectors 112, 116. Alternatively, a recording medium such as a nonvolatile memory or a hard disk can be incorporated in the image pickup apparatus 100.

An operation unit 105 is used by a user to give an image shooting instruction and to set an image shooting condition, etc. to the image pickup apparatus 100. A display unit 107 displays a still image or a moving image according to image data and displays a menu or the like under the control of the CPU 104.

Figure 2A:
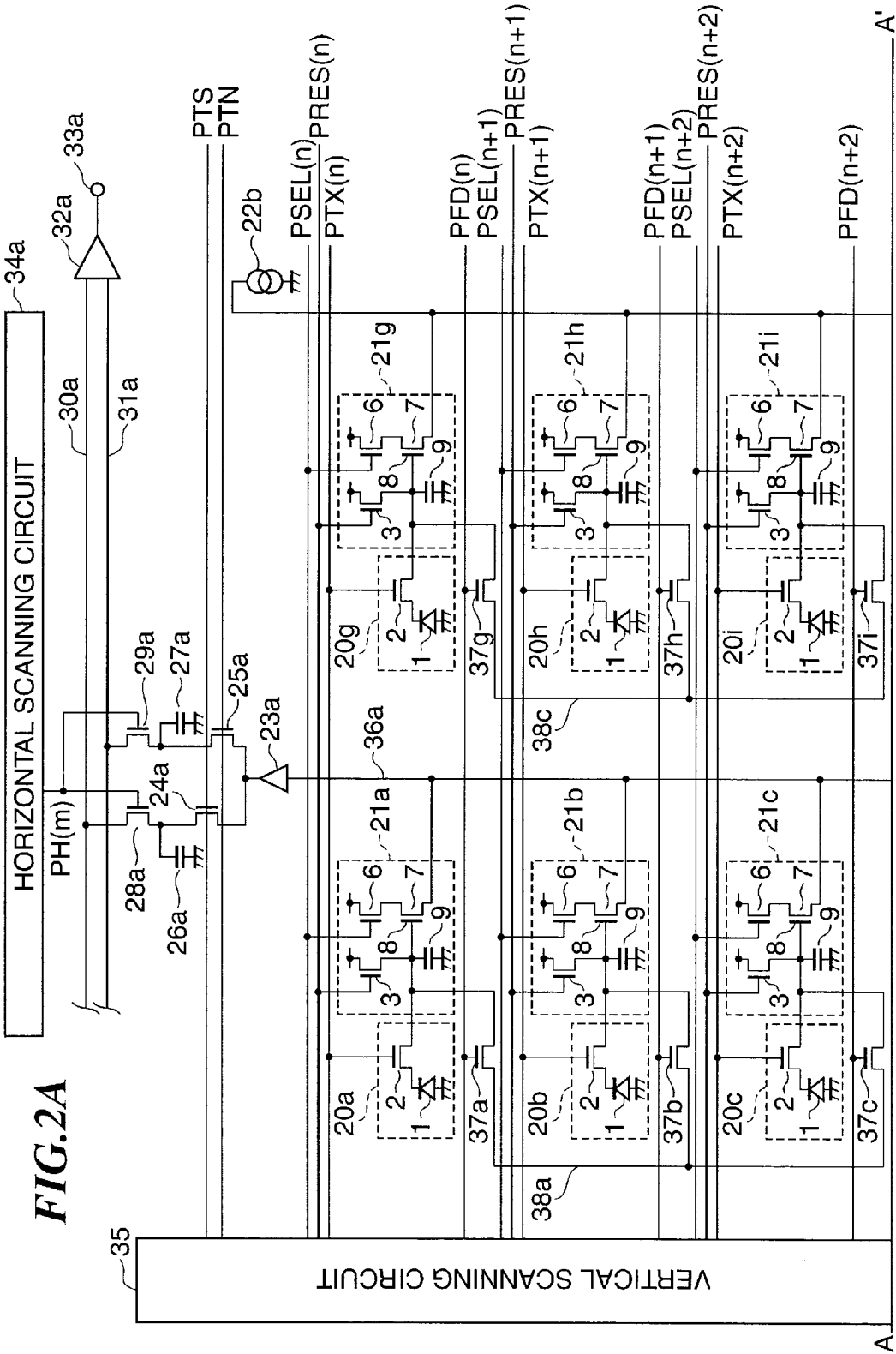
FIGS. 2A and 2B are a view showing an example circuit structure of an image sensing device of the image pickup apparatus.
Figure 2B:
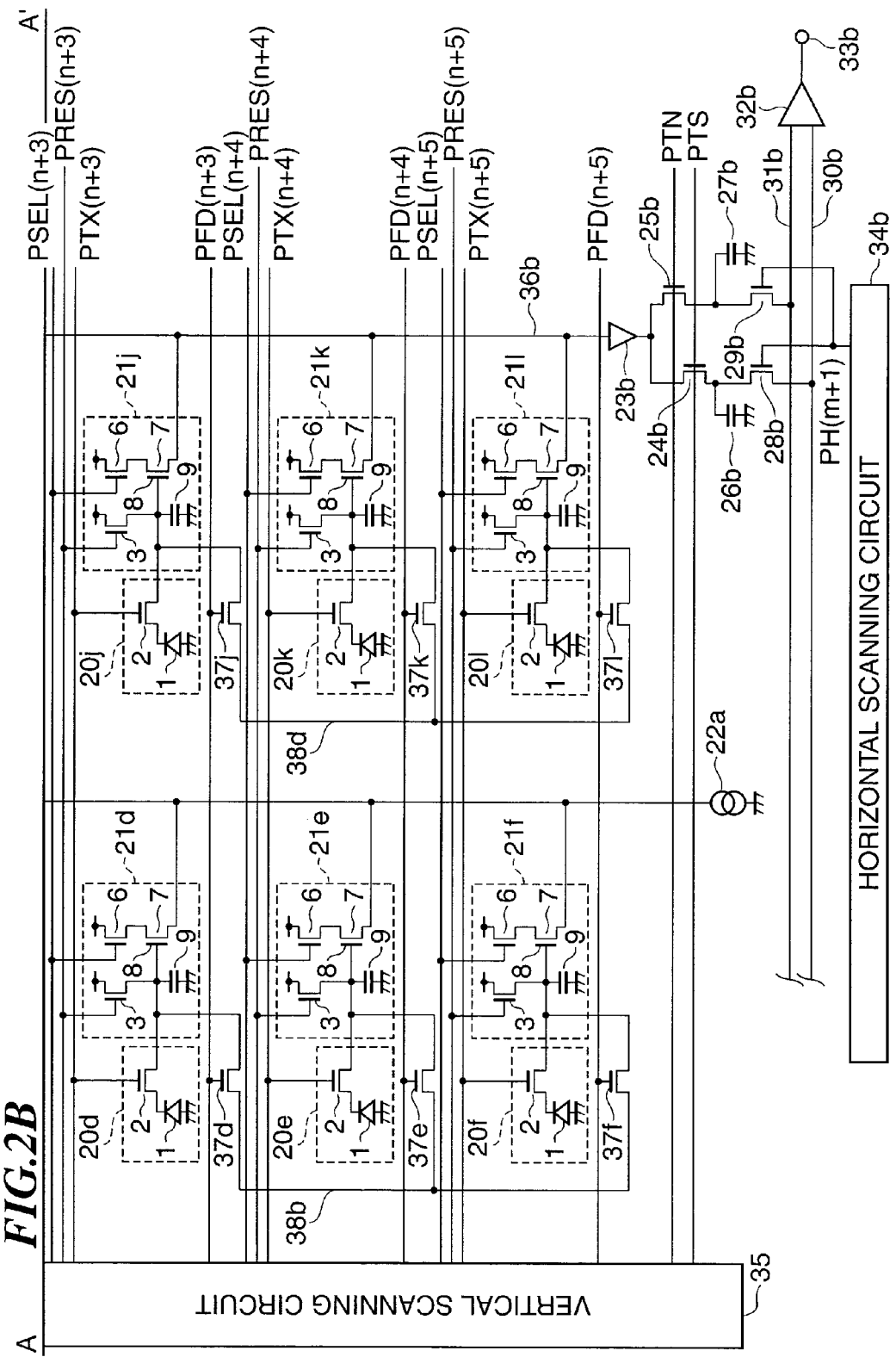

FIGS. 2A and 2B show an example circuit structure of the image sensing device 101.

Referring to FIGS. 2A and 2B, the image sensing device 101 has an effective image region in which a plurality of pixels are arranged in a two-dimensional matrix.

It should be noted that in the case of a color image pickup apparatus, light passes through a color filter before being incident to the image sensing device 101. The color filter has a primary color Bayer pattern, for example. The color filter of primary color Bayer pattern partly shown in FIG. 14 includes filter units that correspond in number to the pixels of the image sensing device 101, where each filter unit is comprised of a R (red) filter, a B (blue) filter, and two G (green) filters. By a known method, pixel signals for respective colors corresponding to the R, B and G filters can be generated from a pixel signal output from each pixel. Pixels corresponding to filters denoted by the same symbol (e.g. G11) in FIG. 14 can be connected to one another, so that three pixel signals of the same color in the same column can be added together, for example. In the following, a description will be simplified by not distinguishing respective colors from one another.

In FIGS. 2A and 2B, for convenience of description, there are only shown pixels of 6 rows and 2 columns in the image sensing device 101. In the effective image region of the image sensing device 101, pixels 20a to 20f are arranged in nth to (n+5)th rows of an mth column and constitute a part of an mth pixel column. Pixels 20g to 20l are arranged in nth to (n+5)th rows of an (m+1)th column and constitute a part of an (m+1)th pixel column. Each of the pixels 20a to 20l includes a photodiode (hereinafter referred to as PD) 1 and a transfer switch 2.

Each of the transfer switches 2 of the pixels 20a, 20g in the nth row is supplied at its gate with a transfer control signal PTX(n) from a vertical scanning circuit 35, and each of the transfer switches 2 of the pixels 20b, 20h in the (n+1)th row is supplied at its gate with a transfer control signal PTX(n+1) from the vertical scanning circuit 35. Similarly, transfer control signals PTX(n+2), PTX(n+3), PTX(n+4), and PTX(n+5) are supplied from the vertical scanning circuit 35 to gates of the transfer switches 2 of the pixels 20c, 20i; 20d, 20j; 20e, 20k, and 20f, 20l, respectively.

In the effective image region of the image sensing device 101, there are provided signal transfer units 21a to 21l respectively connected to the pixels 20a to 20l. Each of the signal transfer units 21a to 21l includes a reset switch 3, a row selection switch 6, a pixel amplifier 7, and a floating diffusion unit (hereinafter referred to as FD) 9 that converts electrical charge generated in the photodiode 1 into a voltage signal.

In the signal transfer units 21a, 21g in the nth row, each of the reset switches 3 is supplied at its gate with a reset control signal PRES(n) from the vertical scanning circuit 35, and each of the row selection switches 6 is supplied at its gate with a selection control signal PSEL(n) from the vertical scanning circuit 35. In the signal transfer units 21b, 21h in the (n+1)th row, each of the reset switches 3 is supplied at its gate with a reset control signal PRES (n+1) from the vertical scanning circuit 35, and each of the row selection switches 6 is supplied at its gate with a selection control signal PSEL(n+1) from the vertical scanning circuit 35. Similarly, in the signal transfer units 21c, 21i; 21d, 21j; 21e, 21k; and 21f, 21l in the (n+2)th to (n+5)th rows, the reset switches 3 are supplied at their gates with reset control signals PRES (n+2) to PRES (n+5) and the row selection switches 6 are supplied at their gates with selection control signals PSEL(n+2) to PSEL(n+5), respectively.

The image sensing device 101 also includes vertical output lines 36a, 36b respectively arranged adjacent to the mth and (m+1)th pixel columns and extending in the column direction. The vertical output line 36a is connected with the signal transfer units 21a to 21f, and the vertical output line 36b is connected with the signal transfer units 21g to 21l.

The vertical output line 36a has one end thereof connected with a constant current source 22a and another end thereof connected with a column amplifier (amplification unit) 23a. The column amplifier 23a is connected to holding capacities (holding memories) 26a, 27a via transfer gates 24a, 25a that are respectively controlled to be turned on and off according to gate control signals PTS, PTN supplied from the vertical scanning circuit 35. The holding capacities 26a, 27a are respectively connected to horizontal output lines 30a, 31a via output transfer switches 28a, 29a that are driven by a horizontal control signal PH(m) supplied from a horizontal scanning circuit 34a.

The horizontal output lines 30a, 31a are connected with a readout amplifier 32a. The readout amplifier 32a obtains an analog output signal by multiplying a difference between outputs from the horizontal output lines 30a, 31a by a predetermined gain and outputs the thus obtained signal from its output terminal 33a (hereinafter sometimes referred to as the output terminal of the image sensing device 101).

The vertical output line 36b has one end thereof connected with a column amplifier (amplification unit) 23b and another end thereof connected with a constant current source 22b. The column amplifier 23b is connected to holding capacities (holding memories) 26b, 27b via transfer gates 24b, 25b that are respectively controlled to be turned on and off according to the gate control signals PTS, PTN supplied from the vertical scanning circuit 35. The holding capacities 26b, 27b are respectively connected to horizontal output lines 30b, 31b via output transfer switches 28b, 29b that are driven by a horizontal control signal PH(m+1) supplied from a horizontal scanning circuit 34b.

The horizontal output lines 30b, 31b are connected with a readout amplifier 32b. The readout amplifier 32b obtains an analog output signal by multiplying a difference between outputs from the horizontal output lines 30b, 31b by a predetermined gain and outputs the thus obtained signal from its output terminal 33b (hereinafter sometimes referred to as the output terminal of the image sensing device 101).

In the signal transfer units 21a to 21c, the pixel amplifiers 7 are respectively connected at their gates 8 with connection switches 37a to 37c that are connected to a common connection line 38a. In the signal transfer units 21d to 21f, the pixel amplifiers 7 are respectively connected at their gates 8 with connection switches 37d to 37f that are connected to a common connection line 38b.

Similarly, in the signal transfer units 21g to 21i, the pixel amplifiers 7 are respectively connected at their gates 8 with the connection switches 37g to 37i that are connected to a common connection line 38c. In the signal transfer units 21j to 21l, the pixel amplifiers 7 are respectively connected at their gates 8 with the connection switches 37j to 37l that are connected to a common connection line 38d. Each of the FDs 9 in the signal transfer units 21a to 21l can selectively be connected to or disconnected from a corresponding one of the connection lines 38a to 38d through a corresponding one of the connection switches 37a to 37l.

The connection switches 37a, 37g in the nth row are supplied at their gates with a connection control signal PFD(n) from the vertical scanning circuit 35. Similarly, the connection switches 37b, 37h; 37c, 37i; 37d, 37j; 37e, 37k; and 37f, 37l in the (n+1)th to (n+5)th rows are respectively supplied at their gates with connection control signals PFD(n+1) to PFD(n+5) from the vertical scanning circuit 35.

In the signal transfer units 21a to 21l, wiring distances between the gates 8 of the pixel amplifiers 7 and corresponding ones of the connection switches 37a to 37l are the same as one another, and wiring distances between the connection switches 37a to 37l and corresponding ones of the connection lines 38a to 38d are also the same as one another.

When any of the connection switches 37a to 37l is selectively turned on to thereby selectively connect the gate 8 of the corresponding pixel amplifier 7 to the corresponding one of the connection lines 38a to 38d, a capacity component connected to the gate 8 of the pixel amplifier 7 increases by the same amount, irrespective of which one of the connection switches 37a to 37l is turned on.

Figure 3A:
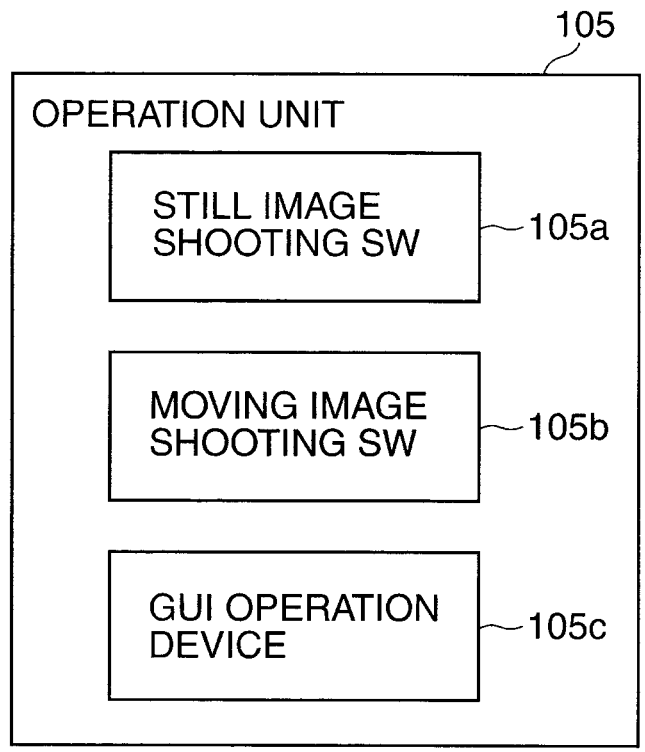
FIG. 3A is a block diagram showing an example construction of an operation unit of the image pickup apparatus.
Figure 3B:
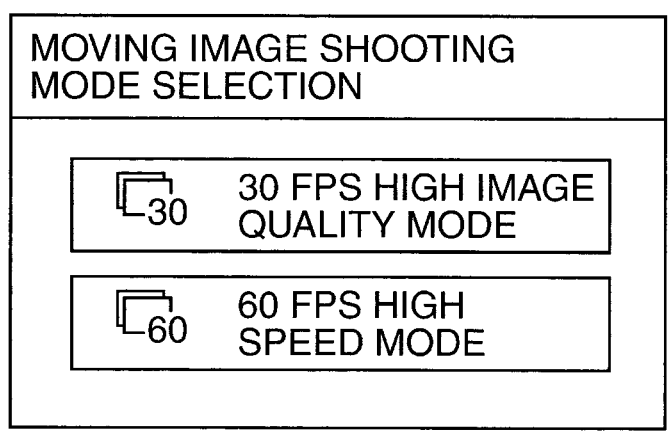
FIG. 3B is a view showing an example of a moving image shooting mode selection screen displayed on a display unit of the image pickup apparatus.

FIG. 3A shows an example construction of the operation unit 105, and FIG. 3B shows an example of a moving image shooting mode selection screen, which is displayed on the display unit 107.

As shown in FIG. 3A, the operation unit 105 includes a still image shooting switch (SW) 105a, a moving image shooting switch (SW) 105b, and a graphic user interface (GUI) operation device 105c. When the still image shooting SW 105a is pressed, an image shooting sensitivity selection screen (not shown) is displayed on the display unit 107. On the image shooting sensitivity selection screen, there are displayed e.g. five options "ISO100", "ISO200", "ISO400", "ISO800" and "ISO1600". The user can select any one of the five options by operating the GUI operation device 105c. When the moving image shooting SW 105b is pressed, the moving image shooting mode selection screen shown in FIG. 3B is displayed on the display unit 107. In the illustrated example, two options "30 fps high image quality mode" and "60 fps high speed mode" are displayed on the moving image shooting mode selection screen. The user can select any one of the two options by operating the GUI operation device 105c.

Figure 4:
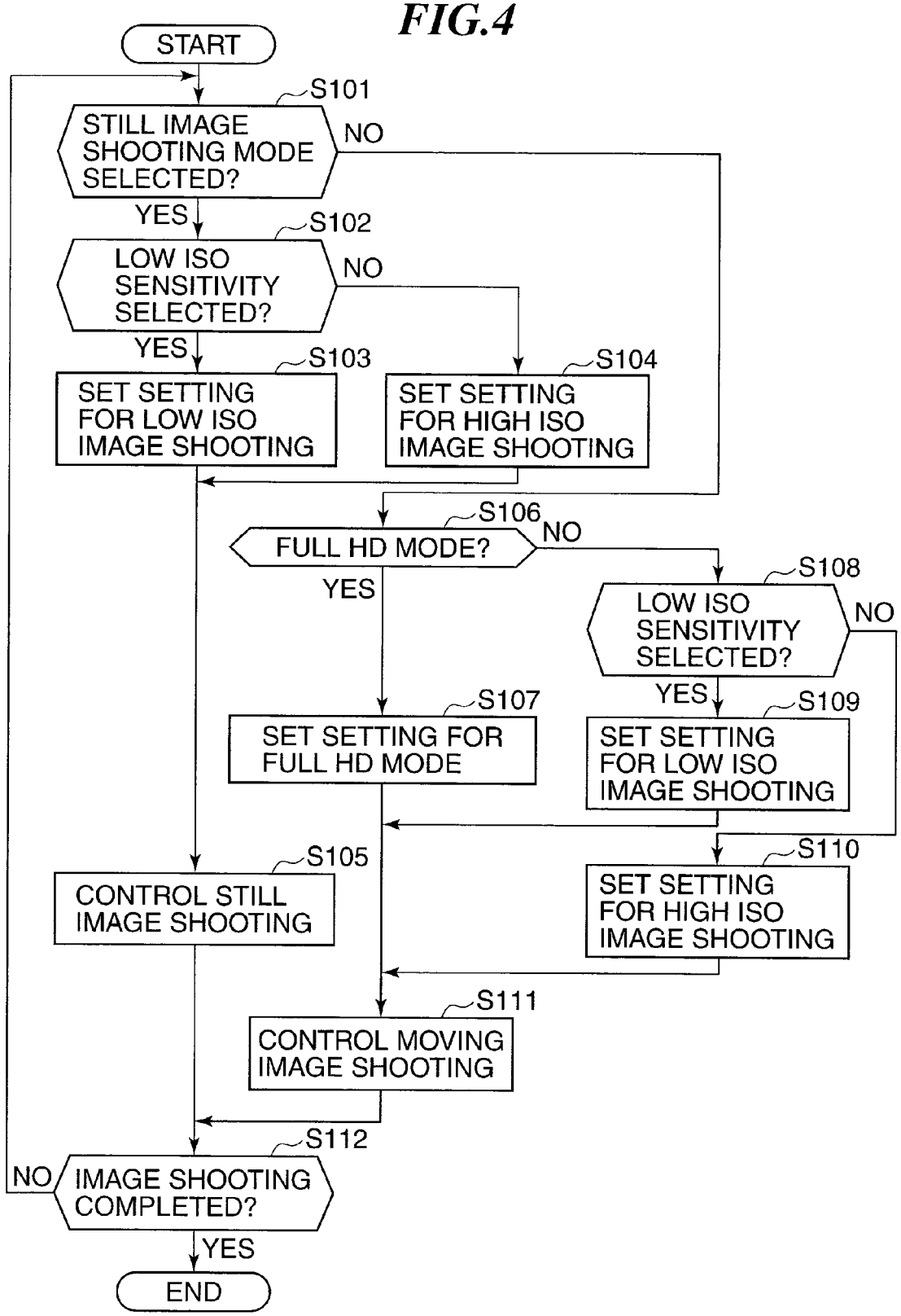
FIG. 4 is a flowchart showing an image shooting operation of the image pickup apparatus.

FIG. 4 shows in flowchart an image shooting operation of the image pickup apparatus 100.

When the still image shooting SW 105a or the moving image shooting SW 105b is pressed by the user, the image shooting operation of FIG. 4 is started. First, the CPU 104 determines whether the still image shooting SW 105a is pressed, thereby determining whether the still image shooting mode is selected (step S101). If the still image shooting SW 105a is pressed to select the still image shooting mode (i.e., if YES to step S101), the CPU 104 determines whether a low ISO sensitivity is selected as image shooting sensitivity which is an image shooting condition (step S102).

When the user selects the option "ISO 100" or "ISO200" on the image shooting sensitivity selection screen (not shown) displayed on the display unit 107 in response to the press of the still image shooting SW 105a, the CPU 104 determines that the low ISO sensitivity is selected (the answer to step S102 is YES), and sets a setting for low ISO sensitivity image shooting (described later) to the image sensing device 101 or to the timing generator 102 (step S103). Then, the CPU 104 controls still image shooting (step S105).

In the following, a description will be given of operation timings of the image sensing device 101 at low ISO still image shooting (second readout mode). FIGS. 5A and 5B show operation timings of the image sensing device 101 at the low ISO still image shooting. The image sensing device 101 is controlled by the timing generator 102 under the control of the CPU 104. It should be noted that in the second readout mode, parts of the connection switches 37a to 37l are sequentially turned on. In the illustrated example, in a case for example that pixel signals are read from pixels 20a, 20g in the nth row, only the connection switches 37a, 37g corresponding to readout object pixels pixels 20a, 20g are turned on.

As shown in FIGS. 5A and 5B, in a time period from a1 to a2 (which is an all-pixel reset time period), the vertical scanning circuit 35 makes the transfer control signals PTX(n) to PTX(n+5) active. As a result, in all the pixels, electrical charges accumulated in the photodiodes 1 are transferred via the transfer switches 2 to the gates 8 of the pixel amplifiers 7.

At the time point a2, the vertical scanning circuit 35 negates the transfer control signals PTX(n) to PTX(n+5), whereby the photodiodes 1 are reset and charge accumulations are simultaneously started in all the pixels.

At some timing in a time period from a2 to a3, light incident to the image sensing device 101 is intercepted by a mechanism (not shown), which is provided outside the image sensing device 101. In a time period from the time point a2 until the incident light is intercepted (i.e., in an accumulation time period), signal charges are accumulated in the photodiodes 1 of all the pixels. It should be noted that signal charge accumulations in all the pixels are simultaneously started in this example, but this is not limitative. It is also possible to reset the photodiodes 1 at different timings on a per column basis.

At the time point a3, the CPU 104 asserts a timing signal HD that represents a readout time for one row. Next, at a time point a4, a vertical transfer (column transfer) for the pixels 20a, 20g in the nth row is started. More specifically, at the time point a4, the vertical scanning circuit 35 makes the selection control signal PSEL(n) active, thereby turning on the row selection switches 6 of the signal transfer units 21a, 21g. As a result, in each of the signal transfer units 21a, 21g, a source follower circuit, which is constituted by the pixel amplifier 7 and the current sources 22a, 22b, becomes operable.

At the time point a4, the vertical scanning circuit 35 makes the connection control signal PFD(n) active, whereby the connection switches 37a, 37g are turned on. In each of the signal transfer units 21a, 21g, the connection line 38a or 38c is connected to the gate 8 of the pixel amplifier 7, so that the capacity component connected to the gate 8 of the pixel amplifier 7 increases to e.g. a value of 2C, where C represents the capacity of the FD 9.

At a time point a5, the vertical scanning circuit 35 makes the reset control signal PRES(n) active, whereby in each of the signal transfer units 21a, 21g, the reset switch 3 is turned on and the capacity determined by the FD 9 and the connection line 38a or 38c is initialized. As a result, a signal having a signal level immediately after being reset (i.e., a so-called dark level) is output to each of the vertical output lines 36a, 36b.

The vertical scanning circuit 35 negates the reset control signal PRES (n) at a time point a6 and makes the gate control signal PTN active at a time point a7, whereby the transfer gates 25a, 25b are turned on, so that the dark level is held in the holding capacities 27a, 27b via the column amplifiers 23a, 23b.

At a time point a8, the vertical scanning circuit 35 negates the gate control signal PTN. Subsequently, at a time point a9, the vertical scanning circuit 35 makes the transfer control signal PTX(n) active, thereby turning on the transfer switches 2 of the pixels 20a, 20g. A signal charge accumulated in the photodiode 1 of each pixel is transferred to the gate 8 of the source follower constituted by the pixel amplifier 7. At that time, the potential of the source follower changes from the reset level by an amount corresponding to the transferred signal charge, so that the signal level is determined.

The vertical scanning circuit 35 negates the transfer control signal PTX(n) at a time point a10 and makes the gate control signal PTS active at a time point a11, whereby the transfer gates 24a, 24b are turned on, so that the signal level is held in the holding capacities 26a, 26b via the column amplifiers 23a, 23b. At a time point a12, the vertical scanning circuit 35 negates the gate control signal PTS, whereby a transfer operation is completed.

By the operation performed up to the time point a12, the signal levels in the pixels 20a, 20g are held in the holding capacities 26a, 26b and the dark levels in the pixels 20a, 20g are held in the holding capacities 27a, 27b, respectively.

At a time point a13 after the vertical transfer from the pixels 20a, 20g is completed, the vertical scanning circuit 35 negates the selection control signal PSEL(n) and the connection control signal PFD(n).

Next, in a time period from a14 to a15, the horizontal scanning circuits 34a, 34b respectively make horizontal control signals PH(m), PH(m+1) active, whereby the holding capacities 26a, 26b are connected to the horizontal output lines 30a, 30b and the holding capacities 27a, 27b are connected to the horizontal output lines 31a, 31b, respectively.

The dark level and the signal level in the pixel 20a are input to the readout amplifier 32a that multiplies a difference between the dark level and the signal level by a predetermined gain to obtain an output signal and outputs the thus obtained signal from the output terminal 33a. Similarly, the dark level and the signal level in the pixel 20g are input to the readout amplifier 32b that outputs from the output terminal 33b an output signal obtained by multiplying a difference between the dark level and the signal level by a predetermined gain. The pixel signal output is completed at the time point a15, and the readout from the pixels in the next row is started at a time point a16.

In a time period from a16 to a11, the selection control signal PSEL(n+1), connection control signal PFD(n+1), reset control signal PRES(n+1), transfer control signal PTX(n+1), gate control signals PTN, PTS, and horizontal control signals PH(m), PH(m+1) are sequentially supplied at the same timings as those in the case of reading the pixel signals from the pixels 20a, 20g in the nth row in the time period from a3 to a16. As a result, pixel signals are output from the pixels 20b, 20h in the (n+1)th row.

Similarly, pixel signals are read from pixels in the (n+2)th to (n+5)th rows in time periods from a11 to a18, from a18 to a19, from a19 to a20 and from a20 to a21, respectively.

By performing the readout operations for all the rows of the image sensing device 101 in the above manner, analog pixel signals are output from all the pixels of the image sensing device 101. As previously described, the analog pixel signals output from the image sensing device 101 are converted into image data by the AFE 103, and the image data is input to the image processing unit 109 in which predetermined processing is performed on the image data. The resultant still image data is recorded in the recording medium 115, and the low ISO still image shooting is completed.

Referring to FIG. 4 again, after controlling the still image shooting in step S105, the CPU 104 determines whether the image shooting has been completed (step S112). If it is determined that the image shooting has not been completed (i.e., if NO to step S112), the flow returns to step S101. On the other hand, if it is determined that the image shooting has been completed (i.e., if YES to step S112), the image pickup apparatus 100 completes the image shooting operation.

Next, a description will be given of high ISO still image shooting.

When the user selects the option "ISO 400" or "ISO800" or "ISO1600" on the image shooting sensitivity selection screen (not shown), which is displayed on the display unit 107 in response to the press of the still image shooting SW 105a, the CPU 104 determines that the low ISO sensitivity is not selected but the high ISO sensitivity is selected (the answer to step S102 is NO), and the CPU 104 sets a setting for high ISO sensitivity image shooting (described later) to the image sensing device 101 or to the timing generator 102 (step S104). Then, the CPU 104 controls still image shooting in step S105.

Figure 6A:
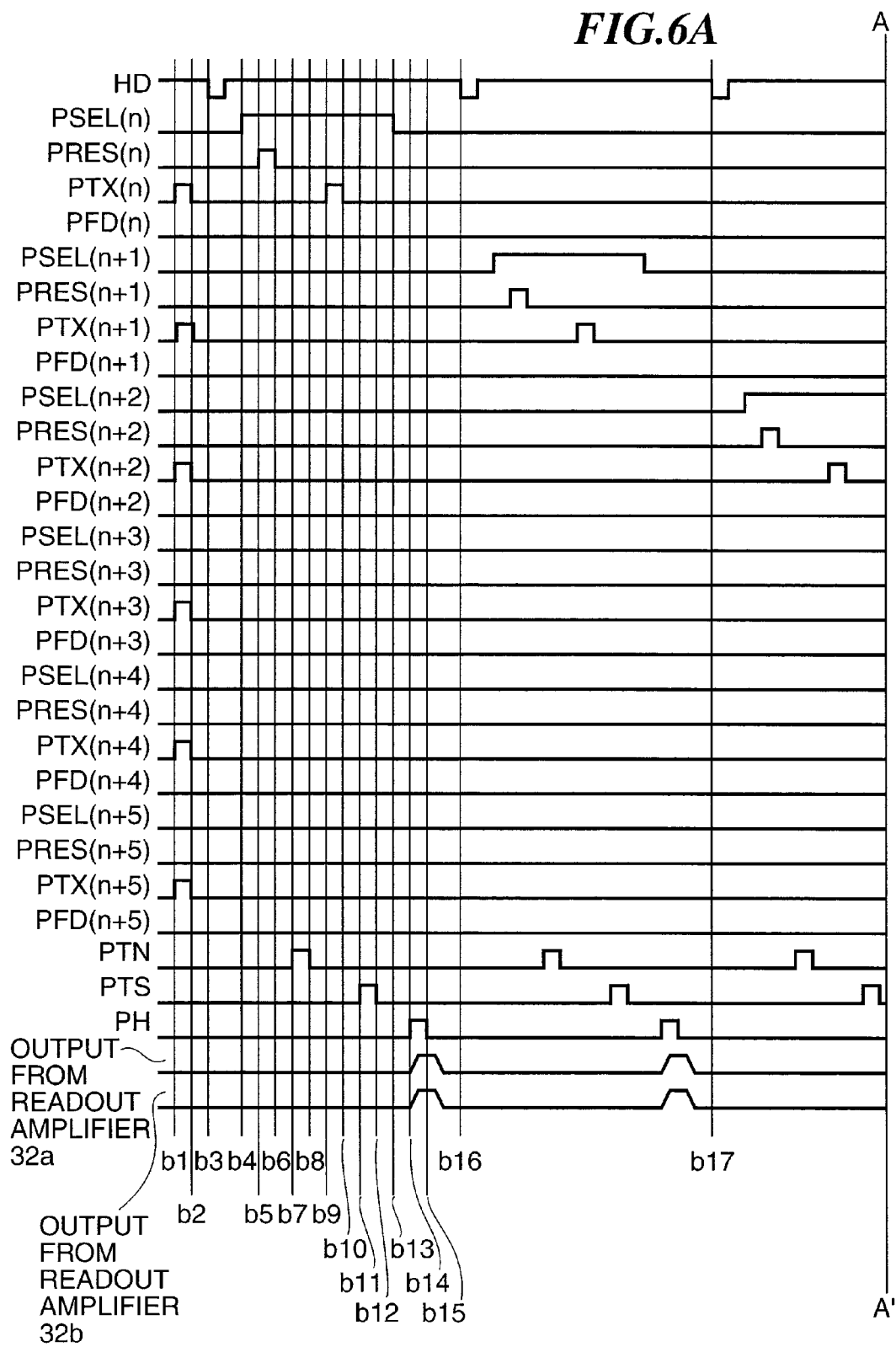

FIGS. 6A and 6B show operation timings of the image sensing device 101 at the high ISO still image shooting (first readout mode). The operation timings in the first readout mode are basically the same as those in the second readout mode shown in FIGS. 5A and 5B, and a description thereof will be simplified.

Referring to FIGS. 6A and 6B, in an all-pixel reset time period from b1 to b2, the transfer control signals PTX(n) to PTX(n+5) are made active, whereby in all the pixels, electrical charges accumulated in the photodiodes 1 are transferred via the transfer switches 2 to the gates 8 of the pixel amplifiers 7.

Next, at the time point b2, the transfer control signals PTX(n) to PTX(n+5) are negated, whereby the photodiodes 1 are reset and charge accumulations are simultaneously started in all the pixels.

In an accumulation time period from the time point b2 until light incident to the image sensing device 101 is intercepted, signal charges are accumulated in the photodiodes 1 of all the pixels.

A timing signal HD is asserted at a time point b3, and a vertical transfer for the pixels 20a, 20g in the nth row is started at a time point b4. More specifically, at the time point b4, the selection control signal PSEL(n) is made active, whereby the row selection switches 6 of the signal transfer units 21a, 21g are turned on. As a result, in each of the signal transfer units 21a, 21g, a source follower circuit constituted by the pixel amplifier 7 and the current sources 22a, 22b becomes operable.

At that time, the connection control signal PFD(n) is kept negated. Thus, in each of the signal transfer units 21a, 21g, the connection line 38a or 38c is not connected to the gate 8 of the pixel amplifier 7, so that the capacity component connected to the gate 8 of the pixel amplifier 7 is kept equal to the capacity "C" of the FD 9.

At a time point b5, the reset control signal PRES(n) is made active, whereby in each of the signal transfer units 21a, 21g, the reset switch 3 is turned on and the capacity determined by the FD 9 and the connection line 38a or 38c is initialized. As a result, a signal having a signal level immediately after being reset (dark level) is output to each of the vertical output lines 36a, 36b.

The reset control signal PRES(n) is negated at a time point b6 and the gate control signal PTN is made active at a time point b7, whereby the transfer gates 25a, 25b are turned on and the dark level is held in the holding capacities 27a, 27b.

The gate control signal PTN is negated at a time point b8 and the transfer control signal PTX(n) is made active at a time point b9, whereby the transfer switches 2 of the pixels 20a, 20g are turned on. A signal charge accumulated in the photodiode 1 of each pixel is transferred to the gate 8 of the source follower, and the potential of the source follower changes from the reset level by an amount corresponding to the transferred signal charge, so that the signal level is determined.

The transfer control signal PTX(n) is negated at a time point b10 and the gate control signal PTS is made active at a time point b11, whereby the transfer gates 24a, 24b are turned on and the signal level is held in the holding capacities 26a, 26b. At a time point b12, the gate control signal PTS is negated.

By the operation performed up to the time point b12, the signal levels in the pixels 20a, 20g are held in the holding capacities 26a, 26b and the dark levels in the pixels 20a, 20g are held in the holding capacities 27a, 27b, respectively.

At a time point b13, the selection control signal PSEL(n) is negated and the connection control signal PFD (n) is kept negated.

In a time period from b14 to b15, the horizontal control signals PH(m), PH (m+1) are made active, whereby the holding capacities 26a, 26b are connected to the horizontal output lines 30a, 30b and the holding capacities 27a, 27b are connected to the horizontal output lines 31a, 31b, respectively.

The dark level and the signal level in the pixel 20a and the dark level and the signal level in the pixel 20b are respectively input to the readout amplifiers 32a, 32b each of which outputs an output signal obtained by multiplying a difference between the dark level and the signal level by a predetermined gain. The pixel signal output is completed at the time point b15, and the readout from the pixels in the next row is started at a time point b16.

In a time period from b16 to b17, the control signals PSEL(n+1), PFD(n+1), PRES(n+1), PTX(n+1), PTN, PTS, PH(m), and PH(m+1) are sequentially supplied at the same timings as those in the case of reading the pixel signals from the pixels 20a, 20g in the nth row. As a result, pixel signals are output from the pixels 20b, 20h in the (n+1)th row.

Similarly, pixel signals are read from pixels in the (n+2)th to (n+5)th rows in time periods from b17 to b18, from b18 to b19, from b19 to b20 and from b20 to b21, respectively.

Pixel signals are output from all the pixels of the image sensing device 101 in the above manner. Still image data obtained from these pixel signals is recorded in the recording medium 115, and the high ISO still image shooting is completed.

Next, a description will be given of a case where the moving image shooting mode is selected.

In the image shooting operation of FIG. 4 started in response to the press of the still image shooting SW 105a or the moving image shooting SW 105b shown in FIG. 3A, the CPU 104 determines in step S101 whether the still image shooting SW 105a is pressed to select the still image shooting mode, as previously described. If the answer to step S101 is NO, the CPU 104 determines that the moving image shooting SW 105b is pressed to select the moving image shooting mode, and the flow proceeds to step S106.

When the moving image shooting SW 105b is pressed, the moving image shooting mode selection screen shown in FIG. 3B is displayed on the display unit 107, and the user operates the GUI operation device 105c shown in FIG. 3A to select either the option "high image quality mode" or the option "high speed mode" displayed on the mode selection screen.

In step S106, the CPU 104 determines whether the high image quality mode (Full HD mode) is selected. If the answer to step S106 is YES, the CPU 104 sets a setting for moving image shooting in high image quality mode (described later) to the image sensing device 101 or to the timing generator 102 (step S107), and controls moving image shooting (step S111).

Figure 7B:
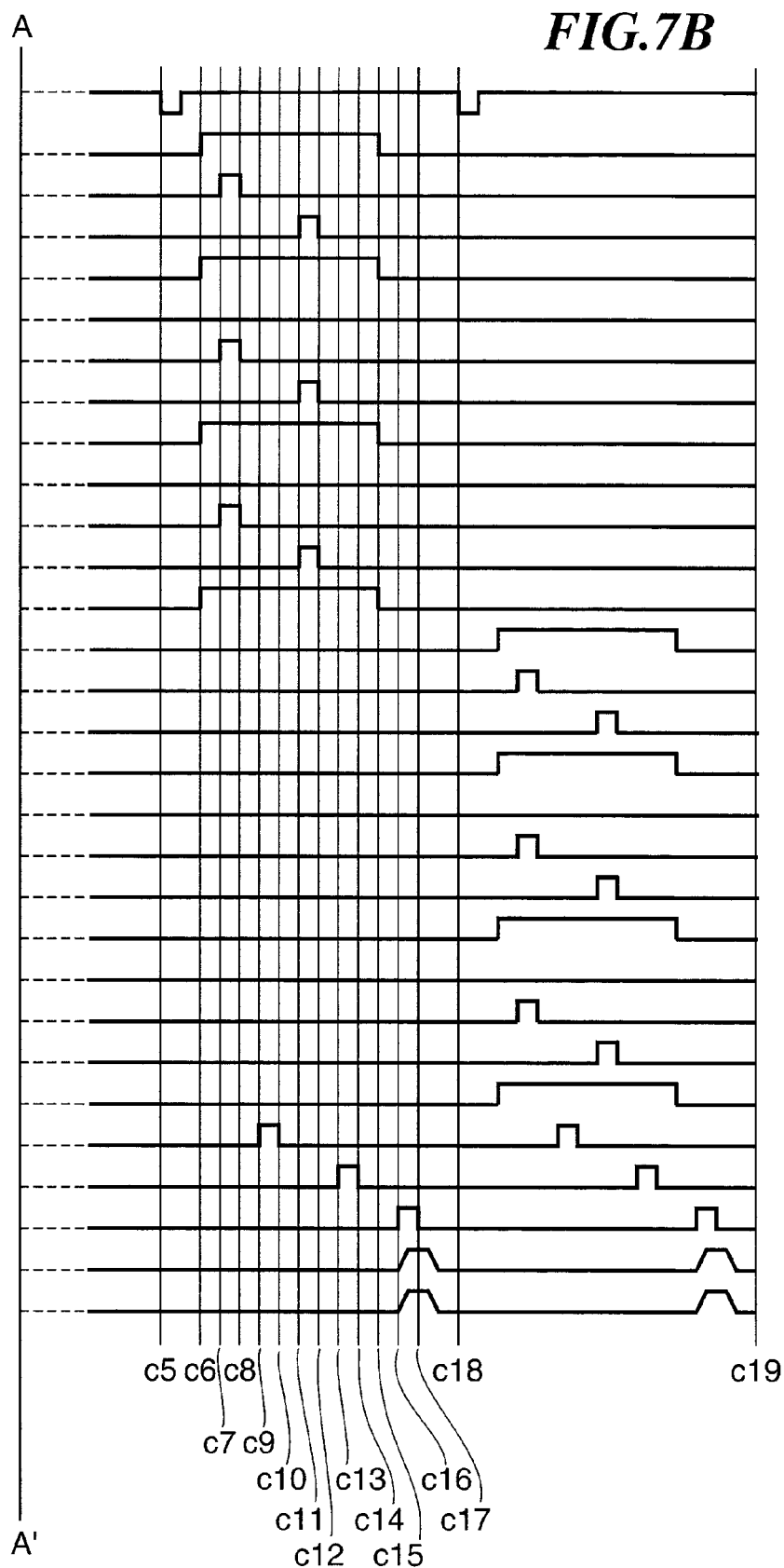

FIGS. 7A and 7B show operation timings of the image sensing device 101 at the moving image shooting in high image quality mode (third readout mode). The operation timings in the third readout mode are basically the same as those in the first and second readout modes shown in FIGS. 6A, 6B and FIGS. 5A, 5B, and a description thereof will be simplified.

As shown in FIGS. 7A and 7B, in a time period from c1 to c2, the transfer control signals PTX(n) to PTX(n+2) are made active, whereby in each of the pixels 20a to 20c and 20g to 20i in the nth to (n+2)th rows, electrical charge accumulated in the photodiode 1 is transferred via the transfer switch 2 to the gate 8 of the pixel amplifier 7 and the photodiode 1 is reset.

Next, in a time period from c3 to c4, the transfer control signals PTX(n+3) to PTX(n+5) are made active, whereby in each of the pixels 20d to 20f and 20j to 20l in the (n+3)th to (n+5)th rows, electrical charge accumulated in the photodiode 1 is transferred via the transfer switch 2 to the gate 8 of the pixel amplifier 7 and the photodiode 1 is reset.

As described above, at the moving image shooting in high image quality mode, photodiodes 1 are sequentially reset on a three-row basis at predetermined time intervals and signal charges are accumulated in the photodiodes 1 in an accumulation time period (i.e., in a time period from when the photodiodes 1 are reset to when pixel signals are read therefrom).

A timing signal HD is asserted at a time point c5, and a vertical transfer for the pixels 20a to 22c and 20g to 20i in the nth to (n+2)th rows is started at a time point c6. More specifically, at the time point c6, the selection control signal PSEL(n) is made active, whereby the row selection switches 6 of the signal transfer units 21a, 21g in the nth row are turned on. As a result, in each of the signal transfer units 21a, 21g, a source follower circuit constituted by the pixel amplifier 7 and the current sources 22a, 22b becomes operable.

At the time point c6, the connection control signals PFD(n) to PFD(n+2) are made active, whereby in each of the signal transfer units 21a to 21c, the connection line 38a is connected to the gate 8 of the pixel amplifier 7, so that the capacity component connected to the gate 8 of the pixel amplifier 7 increases to e.g. a value of 4C, which is four times as large as the capacity "C" of the FD 9.

Similarly, in each of the signal transfer units 21g to 21i, the connection line 38c is connected to the gate 8 of the pixel amplifier 7, the capacity component connected to the gate 8 of the pixel amplifier 7 increases to e.g. a value of "4C".

At a time point c7, the reset control signals PRES(n) to PRES(n+2) are made active, whereby in each of the signal transfer units 21a to 21c and 21g to 21i, the reset switch 3 is turned on and the capacity determined by the connection line 38a or 38c and a set of FDs comprised of three FDs 9 is initialized, and a signal having a dark level is output to each of the vertical output lines 36a, 36b.

The reset control signals PRES (n) to PRES (n+2) are negated at a time point c8, and the gate control signal PTN is made active at a time point c9, whereby the transfer gates 25a, 25b are turned on and the dark level is held in the holding capacities 27a, 27b.

The gate control signal PTN is negated at a time point c10 and the transfer control signals PTX(n) to PTX(n+2) are made active at a time point c11, whereby the transfer switches 2 of the pixels 20a to 20c and 20g to 20i are turned on and signal charges accumulated in the photodiodes 1 are transferred to the gates 8 of the source followers constituted by the pixel amplifiers 7. At that time, the potential of each source follower changes from the reset level by an amount corresponding to the transferred signal charge, so that the signal level is determined.

At the time of charge transfer to each source follower, addition reading is performed. More specifically, signal charges respectively accumulated in the photodiodes 1 of the pixels 20a to 20c in the mth column are added together and the resultant signal is transferred to the source follower. Similarly, signal charges respectively accumulated in the photodiodes 1 of the pixels 20g to 20i in the (m+1)th column are added together and the resultant signal is transferred to the source follower.

The transfer control signals PTX(n) to PTX(n+2) are negated at a time point c12, and the gate control signal PTS is made active at a time point c13, whereby the transfer gates 24a, 24b are turned on, so that a signal level is held in the holding capacities 26a, 26b. At a time point c14, the gate control signal PTS is negated to complete the transfer operation.

By the operation performed up to the time point c14, the signal levels respectively obtained by addition-reading from the pixels 20a to 20c and from the pixels 20g to 20i are respectively held in the holding capacities 26a, 26b, and the dark levels in the pixels 20a to 20c and 20g to 20i are respectively held in the holding capacities 27a, 27b.

At a time point c15 after the vertical transfer from the pixels 20a to 20c and 20g to 20i is completed, the selection control signal PSEL(n) and the connection control signals PFD(n) to PFD(n+2) are negated.

Next, in a time period from c16 to c17, the horizontal control signals PH(m), PH(m+1) are made active, whereby the holding capacities 26a, 26b are connected to the horizontal output lines 30a, 30b and the holding capacities 27a, 27b are connected to the horizontal output lines 31a, 31b, respectively.

The dark level and the signal level after addition in the pixels 20a to 20c and the dark level and the signal level after addition in the pixels 20g to 20i are respectively input to the readout amplifiers 32a, 32b each of which outputs an output signal obtained by multiplying a difference between the dark level and the signal level by a predetermined gain. The pixel signal output is completed at a time point c17, and the readout from the pixels in the next three rows is started at a time point c18.

In a time period from c18 to c19, the control signals PSEL(n+3), PFD(n+3) to PFD(n+5), PRES(n+3) to PRES(n+5), PTX(n+3) to PTX(n+5), PTN, PTS, PH(m), and PH(m+1) are sequentially supplied at the same timings as those in the case of reading the pixel signals from the pixels in the nth to (n+2)th rows, whereby the pixel signals are respectively output from the pixels 20d to 20f and 20j to 20l in the (n+3)th to (n+5)th rows.

By the above-described readout operations of the image sensing device 101, pixel signals are output from one-third of all the pixels of the image sensing device 101. Moving image data obtained from these pixel signals is recorded in the recording medium 115, and the moving image shooting in high image quality mode is completed.

In the image shooting operation of FIG. 4, if the option "high speed mode" is selected on the moving image mode selection screen shown in FIG. 3B, the CPU 104 determines that the high image quality mode is not selected, but the high speed mode is selected (the answer to step S106 is NO), and determines whether the low ISO sensitivity is selected as image shooting sensitivity (step S108).

When determining that the low ISO sensitivity is selected (i.e., if YES to step S108), the CPU 104 sets a setting for low ISO image shooting to the image sensing device 101 or to the timing generator 102 (step S109), and controls moving image shooting (step S111).

Figure 8B:
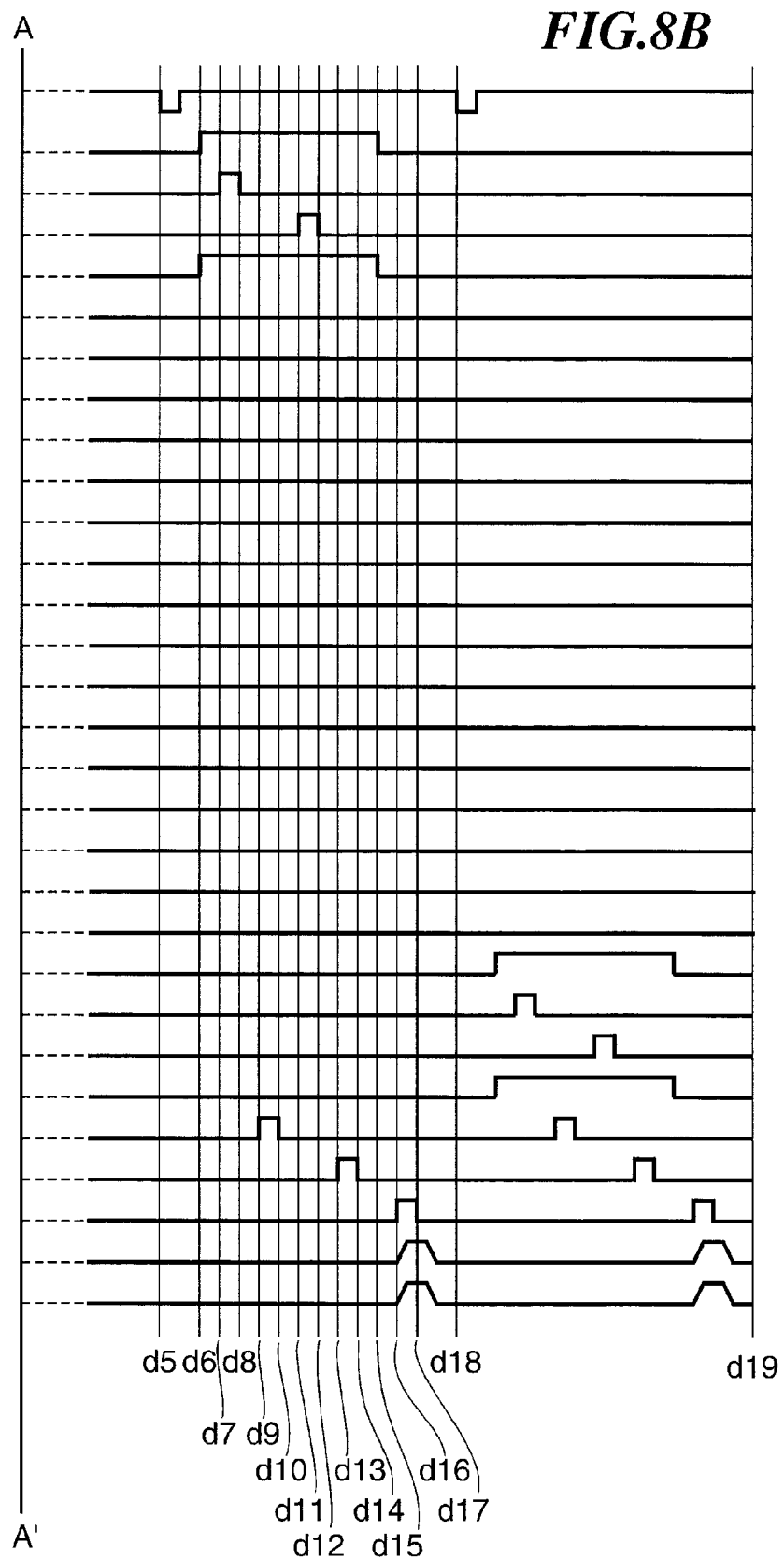

FIGS. 8A and 8B show operation timings of the image sensing device 101 at low ISO moving image shooting in high speed mode. The operation timings shown in FIGS. 8A and 8B are basically the same as those shown in FIGS. 7A and 7B.

As shown in FIGS. 8A and 8B, in a time period from d1 to d2, the transfer control signal PTX(n) is made active, whereby in each of the pixels 20a, 20g in the nth row, electrical charge accumulated in the photodiode 1 is transferred via the transfer switch 2 to the gate 8 of the pixel amplifier 7 and the photodiode 1 is reset.

Next, in a time period from d3 to d4, the transfer control signal PTX(n+5) is made active, whereby in each of the pixels 20f, 20l in the (n+5) row, electrical charge accumulated in the photodiode 1 is transferred via the transfer switch 2 to the gate 8 of the pixel amplifier 7 and the photodiode 1 is reset.

As described above, in the moving image shooting in high speed mode, photodiodes 1 are sequentially reset at intervals of 5 rows and at predetermined time intervals, and signal charges are accumulated in the photodiodes 1 in an accumulation time period from when the photodiodes 1 are reset to when pixel signals are read therefrom.

A timing signal HD is asserted at a time point d5, and a vertical transfer for the pixels 20a, 20g in the nth row is started at a time point d6. More specifically, at the time point d6, the selection control signal PSEL(n) is made active, whereby the row selection switches 6 of the signal transfer units 21a, 21g in the nth row are turned on. As a result, in each of the signal transfer units 21a, 21g, a source follower circuit constituted by the pixel amplifier 7 and the current sources 22a, 22b becomes operable.

At the time point d6, the connection control signal PFD(n) is made active, whereby in each of the signal transfer units 21a, 21g, the connection line 38a or 38c is connected to the gate 8 of the pixel amplifier 7, so that the capacity component connected to the gate 8 of the pixel amplifier 7 increases to e.g. a value of 2C, which is two times as large as the capacity "C" of the FD 9.

At a time point d7, the reset control signal PRES(n) is made active, whereby in each of the signal transfer units 21a, 21g, the reset switch 3 is turned on and the capacity determined by the FD 9 and the connection line 38a or 38c is initialized, and a signal having a dark level is output to each of the vertical output lines 36a, 36b.

The reset control signal PRES(n) is negated at a time point d8, and the gate control signal PTN is made active at a time point d9, whereby the transfer gates 25a, 25b are turned on and the dark level is held in the holding capacities 27a, 27b.

The gate control signal PTN is negated at a time point d10 and the transfer control signal PTX(n) is made active at a time point d11, whereby the transfer switches 2 of the pixels 20a, 20g are turned on and signal charges accumulated in the photodiodes 1 are transferred to the gates 8 of the source followers constituted by the pixel amplifiers 7. At that time, the potential of each source follower changes from the reset level by an amount corresponding to the transferred signal charge, so that the signal level is determined.

The transfer control signal PTX(n) is negated at a time point d12, and the gate control signal PTS is made active at a time point d13, whereby the transfer gates 24a, 24b are turned on, so that a signal level is held in the holding capacities 26a, 26b. At a time point d14, the gate control signal PTS is negated to complete the transfer operation.

By the operation performed up to the time point d14, the signal levels in the pixels 20a, 20g are held in the holding capacities 26a, 26b and the dark levels in the pixels 20a, 20g are held in the holding capacities 27a, 27b, respectively.

At a time point d15 after the vertical transfer from the pixels 20a, 20g is completed, the selection control signal PSEL (n) and the connection control signal PFD (n) are negated. Next, in a time period from d16 to d17, the horizontal control signals PH(m), PH (m+1) are made active, whereby the holding capacities 26a, 26b are connected to the horizontal output lines 30a, 30b and the holding capacities 27a, 27b are connected to the horizontal output lines 31a, 31b, respectively.

The dark level and the signal level in the pixel 20a and the dark level and the signal level in the pixel 20g are respectively input to the readout amplifiers 32a, 32b each of which outputs an output signal obtained by multiplying a difference between the dark level and the signal level by a predetermined gain. The pixel signal output is completed at a time point d17, and the readout from the pixels in the next row is started at a time point d18.

In a time period from d18 to d19, the control signals PSEL (n+5), PFD(n+5), PRES(n+5), PTX(n+5), PTN, PTS, PH(m), and PH(m+1) are sequentially supplied at the same timings as those in the case of reading the pixel signals from the pixels 20a, 20g in the nth row, whereby the pixel signals are output from the pixels 20f, 20l in the (n+5) row.

By the above-described readout operations of the image sensing device 101, pixel signals are output from one-fifth of all the pixels of the image sensing device 101. Moving image data obtained from these pixel signals is recorded in the recording medium 115, and the low ISO moving image shooting in high speed mode is completed.

In the image shooting operation of FIG. 4, if the high ISO sensitivity is selected by the user on the image shooting sensitivity selection screen (not shown) displayed on the display unit 107, the CPU 104 determines that the low ISO sensitivity is not selected, but the high ISO sensitivity is selected (the answer to step S108 is NO), and sets a setting for high ISO image shooting in high speed mode to the image sensing device 101 or to the timing generator 102 (step S110). Next, the CPU 104 controls moving image shooting (step S111).

Figure 9A:
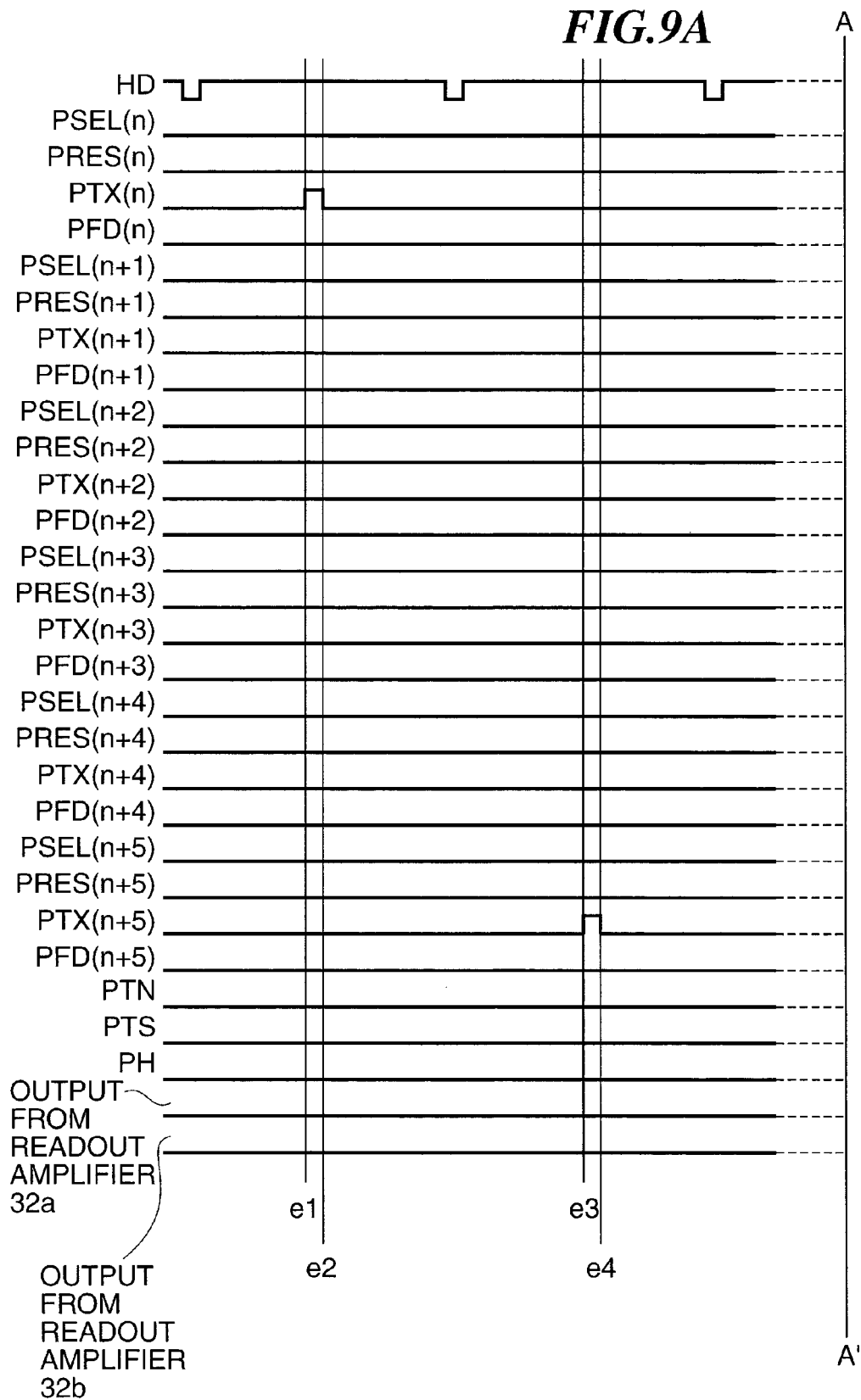
FIGS. 9A and 9B are a timing chart showing operation timings of the image sensing device at high ISO moving image shooting in high speed mode.
Figure 9B:
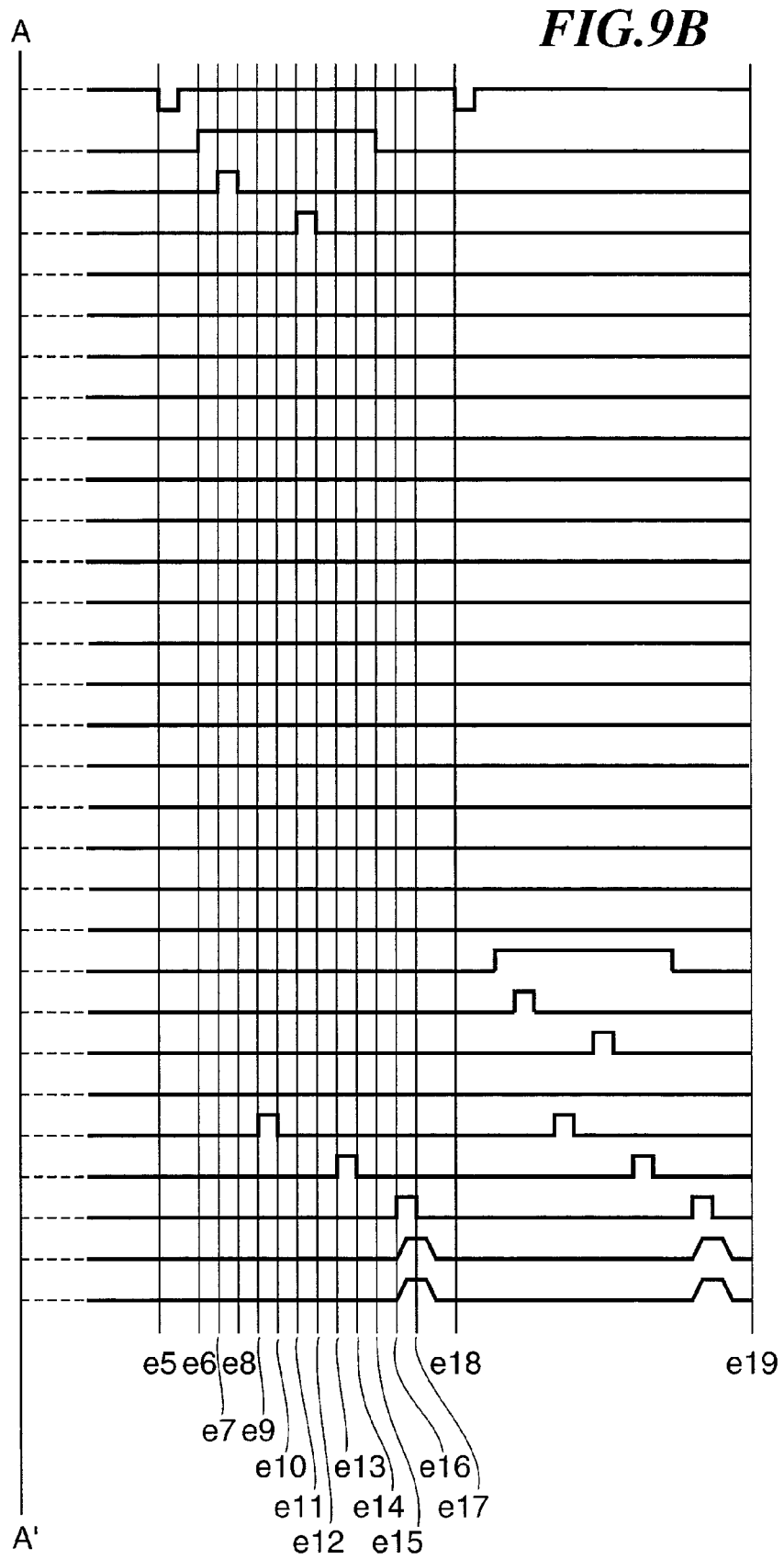

FIGS. 9A and 9B show operation timings of the image sensing device 101 at high ISO moving image shooting in high speed mode. The operation timings shown in FIGS. 9A and 9B are basically the same as those shown in FIGS. 8A and 8B.

As shown in FIGS. 9A and 9B, in a time period from e1 to e2, the transfer control signal PTX(n) is made active, whereby in each of the pixels 20a, 20g in the nth row, electrical charge accumulated in the photodiode 1 is transferred via the transfer switch 2 to the gate 8 of the pixel amplifier 7 and the photodiode 1 is reset.

Next, in a time period from e3 to e4, the transfer control signal PTX(n+5) is made active, whereby in each of the pixels 20f, 20l in the (n+5)th row, electrical charge accumulated in the photodiode 1 is transferred via the transfer switch 2 to the gate 8 of the pixel amplifier 7 and the photodiode 1 is reset.

A timing signal HD is asserted at a time point e5, and a vertical transfer for the pixels 20a, 20g in the nth row is started at a time point e6. More specifically, at the time point e6, the selection control signal PSEL(n) is made active, whereby the row selection switches 6 of the signal transfer units 21a, 21g in the nth row are turned on. As a result, in each of the signal transfer units 21a, 21g, a source follower circuit constituted by the pixel amplifier 7 and the current source 22a, 22b becomes operable.

At that time, the connection control signal PFD(n) is kept negated. Thus, in each of the signal transfer units 21a, 21g, the connection line 38a or 38c is not connected to the gate 8 of the pixel amplifier 7, so that the capacity component connected to the gate 8 of the pixel amplifier 7 is kept equal to the capacity "C" of the FD 9.

At a time point e7, the reset control signal PRES(n) is made active, whereby in each of the signal transfer units 21a, 21g, the reset switch 3 is turned on and the capacity determined by the FD 9 and the connection line 38a or 38c is initialized, so that a signal having a dark level is output to each of the vertical output lines 36a, 36b.

The reset control signal PRES(n) is negated at a time point e8 and the gate control signal PTN is made active at a time point e9, whereby the transfer gates 25a, 25b are turned on and the dark level is held in the holding capacities 27a, 27b.

The gate control signal PTN is negated at a time point e10 and the transfer control signal PTX(n) is made active at a time point e11, whereby the transfer switches 2 of the pixels 20a, 20g are turned on and signal charges accumulated in the photodiodes 1 are transferred to the gates 8 of the source followers constituted by the pixel amplifiers 7. At that time, the potential of each source follower changes from the reset level by an amount corresponding to the transferred signal charge, so that the signal level is determined.

The transfer control signal PTX(n) is negated at a time point e12 and the gate control signal PTS is made active at a time point e13, whereby the transfer gates 24a, 24b are turned on, so that a signal level is held in the holding capacities 26a, 26b. At a time point e14, the gate control signal PTS is negated.

By the operation performed up to the time point e14, the signal levels in the pixels 20a, 20g are held in the holding capacities 26a, 26b and the dark levels in the pixels 20a, 20g are held in the holding capacities 27a, 27b, respectively.

At a time point e15 after the vertical transfer from the pixels 20a, 20g is completed, the selection control signal PSEL(n) is negated. Next, in a time period from e16 to e17, the horizontal control signals PH(m), PH (m+1) are made active, whereby the holding capacities 26a, 26b are connected to the horizontal output lines 30a, 30b and the holding capacities 27a, 27b are connected to the horizontal output lines 31a, 31b, respectively.

The dark level and the signal level in the pixel 20a and the dark level and the signal level in the pixel 20g are respectively input to the readout amplifiers 32a, 32b each of which outputs an output signal obtained by multiplying a difference between the dark level and the signal level by a predetermined gain. The pixel signal output is completed at a time point e17, and the readout from the pixels in the next row is started at a time point e18.

In a time period from e18 to e19, the control signals PSEL (n+5), PFD(n+5), PRES(n+5), PTX(n+5), PTN, PTS, PH(m), and PH(m+1) are sequentially supplied at the same timings as those in the case of reading the pixel signals from the pixels 20a, 20g in the nth row, whereby the pixel signals are output from the pixels 20f, 20l in the (n+5) row.

By the above-described readout operations of the image sensing device 101, pixel signals are output from one-fifth of all the pixels of the image sensing device 101. Moving image data obtained from these pixel signals is recorded in the recording medium 115, and the high ISO moving image shooting in high speed mode is completed.

In the above-described first embodiment, at the low ISO still image shooting, capacity components connected to pixel amplifiers 7 are each increased, whereby dynamic range can be ensured. On the other hand, at the high ISO still image shooting, the gains of pixel amplifiers 7 are increased, while keeping each of capacity components connected to the pixel amplifiers 7 equal to the capacity of the FD 9, whereby the gain in a stage subsequent to the image sensing device 101 can be made small, and as a result, noise can be reduced.

At moving image shooting in high image quality mode, pixel signals from each set of pixels arranged in the same column are added together, whereby image quality can be improved. In the high speed mode, thinning readout in which the number of readout object pixels is decreased is performed, whereby frame rate can be increased. In addition, at the low ISO image shooting, capacity components connected to pixel amplifiers 7 are increased, whereby dynamic range can be ensured. On the other hand, at the high ISO image shooting, gains of pixel amplifiers 7 are increased, while keeping each of capacity components connected to the pixel amplifiers 7 equal to the capacity of the FD 9, whereby the gain in a stage subsequent to the image sensing device 101 can be made small, and as a result, noise can be reduced.

In the first embodiment, depending on the image shooting sensitivity, pixel amplifiers are sequentially connected at their gates to corresponding connection lines, but this is not limitative. For example, whether or not an object's brightness measured e.g. in live view is high can be determined in a flowchart corresponding to FIG. 4, and in a case that the object brightness is high, pixel amplifiers 7 can be connected at their gates to connection lines to increase capacity components connected to the pixel amplifiers 7. On the other hand, in a case that the object brightness is low, the gates of the pixel amplifiers can be disconnected from the connection lines to keep each of the capacity components connected to the pixel amplifiers equal to the FD's capacity in order to reduce influence of noise.

Second Embodiment

Next, a description will be given of an example of an image pickup apparatus according to a second embodiment of this invention. It should be noted that the image pickup apparatus of this embodiment is the same in construction as the image pickup apparatus 100 shown in FIG. 1 except for column amplifiers (amplification units) corresponding to the column amplifiers 23a, 23b shown in FIGS. 2A and 2B.

Figure 10:
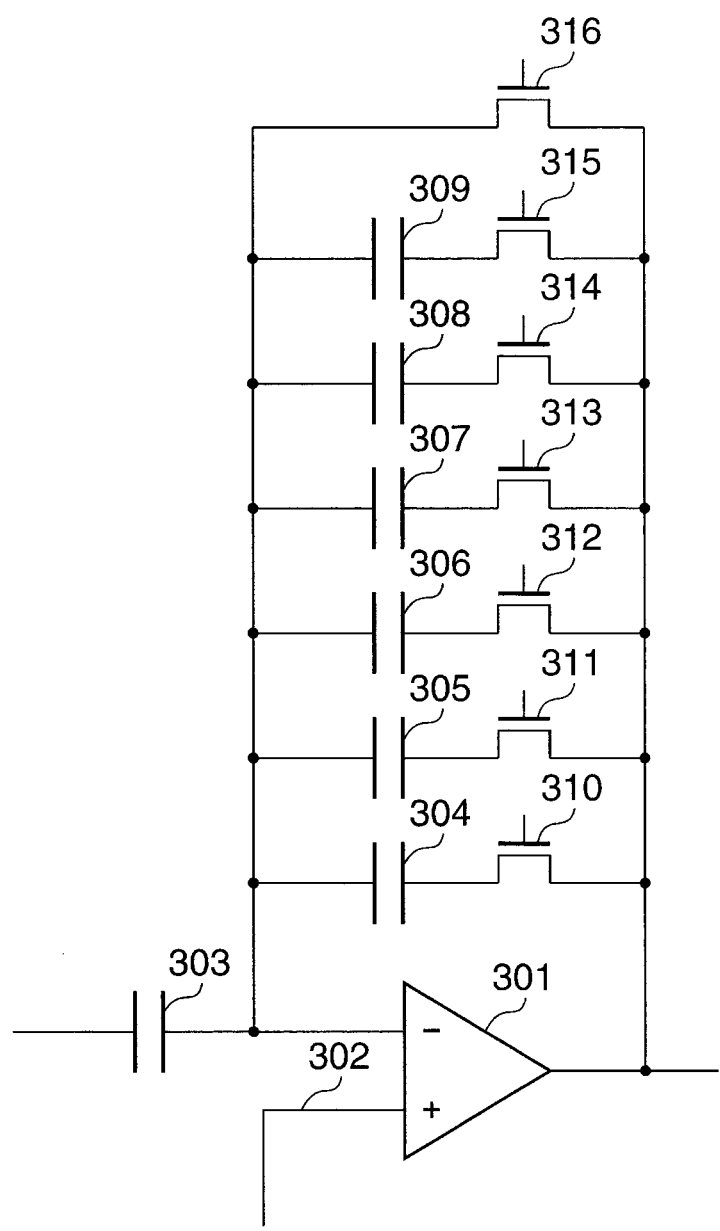
FIG. 10 is a view showing the construction of each column amplifier of an image sensing device of an image pickup apparatus according to a second embodiment of this invention.

FIG. 10 shows the construction of each column amplifier of the image sensing device 101 of this embodiment.

The column amplifier shown in FIG. 10 has a variable gain which is changed as described later. The column amplifier includes an input capacitor 303 that clamps pixel signals sequentially output from corresponding pixels of the image sensing device 101. The input capacitor 303 is connected to an inverting input terminal (−) of a differential amplifier 301 that has a non-inverting input terminal (+) applied with a reference voltage 302.

The column amplifier includes first to sixth column amplifier elements, which are comprised of first to sixth feedback capacitors 304 to 309 and first to sixth mode selection switches 310 to 315 respectively connected in series with the feedback capacitors 304 to 309. The first to sixth column amplifier elements are connected in parallel to one another. The feedback capacitors 304 to 309 each have one end thereof connected to the inverting input terminal of the differential amplifier 301. The mode selection switches 310 to 315 each have one end thereof connected to an output terminal of the differential amplifier 301.

The column amplifier further includes a reset switch 316 connected in parallel to the first to sixth column amplifier elements. When the reset switch 316 is turned on, the differential amplifier 301 is reset.

The differential amplifier 301 has a gain that varies according to which one of the mode selection switches 310 to 315 is turned on. The gain of the differential amplifier 301 is represented by a value obtained by dividing a capacity of the input capacitor 303 by a capacity of the turned-on capacitor.

In this embodiment, the feedback capacitors 304 to 309 have capacities which are 1 time, ½ times, ¼ times, ⅛ times, 1/16 times, and 1/32 times as large as the capacity of the input capacitor 303, respectively. In other words, a 1-time, 2-times, 4-times, 8-times, 16-times or 32-times gain can be selected as the gain of the differential amplifier 301 (i.e., as the gain of the column amplifier) by turning on a corresponding one of the mode selection switches 310 to 315, whereby the input pixel signal can be amplified with the selected gain.

Next, an image shooting operation of the image pickup apparatus of this embodiment will be described. Except for operation of the column amplifiers (hereinafter referred to as the column amplifiers 23a, 23b), the image shooting operation of the image pickup apparatus is the same as that of the first embodiment. In the following, the operation of the column amplifiers 23a, 23b will mainly be described.

At low ISO still image shooting, the image sensing device 101 of the image pickup apparatus operates at operation timings shown in FIGS. 5A and 5B. In a time period from a4 to a5 in FIGS. 5A and 5B, the vertical scanning circuit 35 of the image sensing device 101 turns on the reset switches 316 of the column amplifiers 23a, 23b under the control of the timing generator 102, thereby resetting the column amplifiers 23a, 23b.

At the time of electrical charge transfer in a time period from a5 to a12, the vertical scanning circuit 35 turns on the mode selection switch 310 or 311 according to the ISO sensitivity selected by the user. When the ISO 100 is selected, the mode selection switch 310 is turned on and the differential amplifier 301 provides the 1-time gain. When the ISO 200 is selected, the mode selection switch 311 is turned on and the amplifier 301 provides the 2-times gain.

By the operation performed by the image sensing device 101 up to the time point a12 under the above-described gain selection state, signal levels in the pixels 20a, 20g in nth row are multiplied by the 1-time or 2-times gain corresponding to the selected ISO sensitivity, and the signal levels after gain multiplication are held in the holding capacities 26a, 26b. Dark levels in the pixels 20a, 20g are also multiplied by the 1-time or 2-times gain and the dark levels after gain multiplication are held in the holding capacities 27a, 27b. Subsequently, in a time period from a14 to a15, output signals after multiplication of the 1-time or 2-times gain are output from the output terminals 33a, 33b. This also applies to other rows.

At high ISO still image shooting, the image sensing device 101 operates at operation timings shown in FIGS. 6A and 6B. In a time period from b4 to b5 in FIGS. 6A and 6B, the reset switches 316 of the column amplifiers 23a, 23b are turned on to reset the column amplifiers 23a, 23b. At the time of charge transfer in a time period from b5 to b12, the mode selection switch 311, 312, or 313 is turned on according to the ISO sensitivity selected by the user. When the ISO 400 is selected, the switch 311 is turned on and the differential amplifier 301 provides the 2-times gain. When the ISO 800 is selected, the switch 312 is turned on and the amplifier 301 provides the 4-times gain. When the ISO 1600 is selected, the switch 313 is turned on and the amplifier 301 provides the 8-times gain.

By the operation performed by the image sensing device 101 up to the time point b12 under the gain selection state, signal levels in the pixels 20a, 20g in nth row are multiplied by the 2-times, 4-times or 8-times gain corresponding to the selected ISO sensitivity, and the signal levels after gain multiplication are held in the holding capacities 26a, 26b. Dark levels in the pixels 20a, 20g are also multiplied by the 2-times, 4-times or 8-times gain and the dark levels after gain multiplication are held in the holding capacities 27a, 27b. Subsequently, in a time period from b14 to b15, output signals after multiplication of the 2-times, 4-times or 8-times gain are output from the output terminals 33a, 33b. This also applies to other rows.

At moving image shooting in high image quality mode, the image sensing device 101 operates at operation timings shown in FIGS. 7A and 7B. In a time period from c6 to c7 in FIGS. 7A and 7B, the reset switches 316 of the column amplifiers 23a, 23b are turned on to reset the column amplifiers 23a, 23b. At the time of charge transfer in a time period from c7 to c14, any one of the second to sixth mode selection switches 311 to 315 is turned on according to the ISO sensitivity selected by the user. When one of the ISO 100, ISO 200, ISO 400, ISO 800 and ISO 1600 is selected, a corresponding one of the mode selection switches 311 to 315 is turned on and the 2-times, 4-times, 8-times, 16-times or 32-times gain is selected as the gain of the differential amplifier 301.

By the operation performed by the image sensing device 101 up to the time point c12 under the gain selection state, a signal level obtained by adding together signals in the pixels 20a to 20c in the nth to (n+2)th rows is multiplied by the 2-times, 4-times, 8-times, 16-times or 32-times gain corresponding to the selected ISO sensitivity, and the signal level after gain multiplication is held in the holding capacity 26a. A signal level obtained by adding together signals in the pixels 20g to 20i in the nth to (n+2)th rows is multiplied by the 2-times, 4-times, 8-times, 16-times or 32-times gain corresponding to the selected ISO sensitivity, and the signal level after gain multiplication is held in the holding capacity 26b. Dark levels in the pixels 20a to 20c and dark levels in the pixels 20g to 20i are also multiplied by the 2-times, 4-times, 8-times, 16-times or 32-times gain and the dark levels after gain multiplication are held in the holding capacities 27a, 27b, respectively.

Subsequently, in a time period from c16 to c17, output signals after multiplication of the 2-times, 4-times, 8-times, 16-times or 32-times gain are respectively output from the output terminals 33a, 32b of the image sensing device 101. This also applies to other rows.

At low ISO moving image shooting in high speed mode, the image sensing device 101 operates at operation timings shown in FIGS. 8A and 8B. In a time period from d6 to d7 in FIGS. 8A and 8B, the reset switches 316 of the column amplifiers 23a, 23b are turned on to reset the column amplifiers 23a, 23b. At the time of charge transfer in a time period from d7 to d14, the mode selection switch 310 or 311 is turned on according to which of the ISO 100 and ISO 200 is selected as the ISO sensitivity by the user, whereby the 1-time or 2-times gain is selected as the gain of the differential amplifier 301.

By the operation performed by the image sensing device 101 up to the time point d12 under the gain selection state, signal levels in the pixels 20a, 20g are multiplied by the 1-time or 2-times gain corresponding to the selected ISO sensitivity, and the signal levels after gain multiplication are held in the holding capacities 26a, 26b, respectively. Dark levels in the pixels 20a, 20g are also multiplied by the 1-time or 2-times gain and the dark levels after gain multiplication are held in the holding capacities 27a, 27b, respectively. Subsequently, in a time period from d16 to d17, output signals after multiplication of the 1-time or 2-times gain are respectively output from the output terminals 33a, 32b of the image sensing device 101. This also applies to other rows.

At high ISO moving image shooting in high speed mode, the image sensing device 101 operates at operation timings shown in FIGS. 9A and 9B. In a time period from e6 to e7 in FIGS. 9A and 9B, the reset switches 316 of the column amplifiers 23a, 23b are turned on to reset the column amplifiers 23a, 23b. At the time of charge transfer in a time period from e7 to e14, the mode selection switch 311, 312 or 313 is turned on according to which of the ISO 400, ISO 800 and ISO 1600 is selected as the ISO sensitivity by the user, whereby the 2-times, 4-times or 8-times gain is selected as the gain of the differential amplifier 301.

By the operation performed by the image sensing device 101 up to the time point e12 under the gain selection state, signal levels in the pixels 20a, 20g are multiplied by the 2-times, 4-times or 8-times gain corresponding to the selected ISO sensitivity, and the signal levels after gain multiplication are held in the holding capacities 26a, 26b, respectively. Dark levels in the pixels 20a, 20g are also multiplied by the 2-times, 4-times or 8-times gain and the dark levels after gain multiplication are held in the holding capacities 27a, 27b, respectively. Subsequently, in a time period from e16 to e17, output signals after multiplication of the 2-times, 4-times or 8-times gain are respectively output from the output terminals 33a, 32b of the image sensing device 101. This also applies to other rows.

Figure 11:
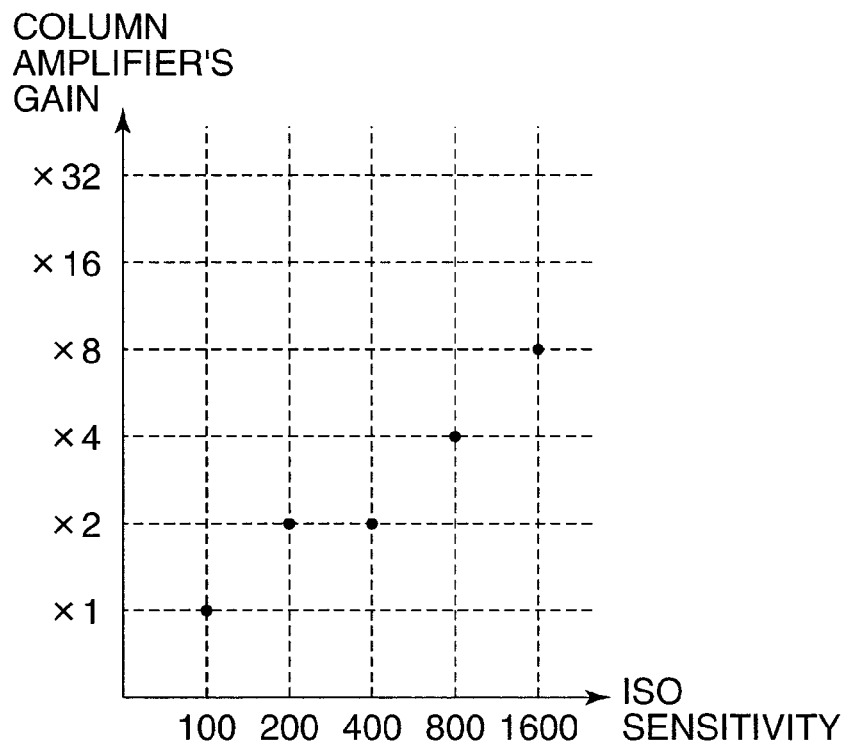
FIG. 11 is a view showing a relation between image shooting sensitivity and column amplifier's gain at still image shooting.

FIG. 11 shows a relation between the image shooting sensitivity and the gain of each of the column amplifiers 23a, 23b at still image shooting.

In a case that the low ISO sensitivity (ISO 100 or ISO 200) is selected at still image shooting, a readout operation is performed while capacity components connected to pixel amplifiers 7 are each increased to a value of "2C" which is two times larger than the capacity "C" of the FD 9, as described above. Accordingly, the gain of each pixel amplifier 7 decreases to one-half of that attained when the capacity component connected to each pixel amplifier 7 is equal to the capacity "C" of the FD 9. As shown in FIG. 11, when the selected image shooting sensitivity is ISO 100 or ISO 200, each column amplifier provides the 1-time or 2-times gain in this embodiment. On the other hand, when the image shooting sensitivity is ISO 400, ISO 800 or ISO 1600, each column amplifier provides the 2-times, 4-times or 8-times gain.

As a result, at the ISO 100, ISO 200, ISO 400, ISO 800, and ISO 1600, the total gain of the pixel amplifier and column amplifier at the readout operation becomes ½-times, 1-time, 1-time, 2-times and 4-times gains, respectively.

Figure 12:
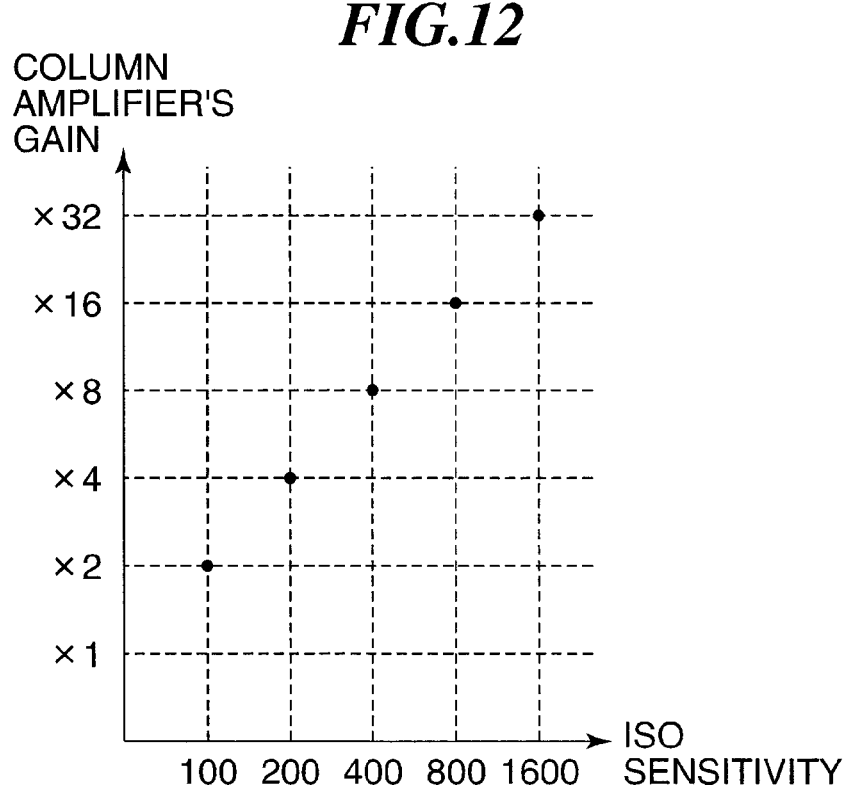
FIG. 12 is a view showing a relation between image shooting sensitivity and column amplifier's gain at moving image shooting in high image quality mode.

FIG. 12 shows a relation between the image shooting sensitivity and the gain of each of column amplifiers 23a, 23b at moving image shooting in high image quality mode.

In the case of moving image shooting in high image quality mode, a readout operation is performed while pixel amplifiers, which are associated with three pixels arranged in the same column, are connected to a connection line to thereby increase the capacity component connected to each pixel amplifier to a value of "4C" which is four times larger than the capacity "C" of the FD 9, as described above. Accordingly, the gain of each pixel amplifier decreases to one-fourth of that attained when the pixel amplifiers are not connected to the connection line.

As shown in FIG. 12, when the ISO 100, ISO 200, ISO 400, ISO 800 or ISO 1600 is selected, each column amplifier provides the 2-times, 4-times, 8-times, 16-times or 32-times gain in this embodiment. As a result, at the ISO 100, ISO 200, ISO 400, ISO 800, and ISO 1600, the total gain of the pixel amplifier and column amplifier at the readout operation becomes ½-times, 1-time, 2-times, 4-times and 8-times gains, respectively.

Figure 13:
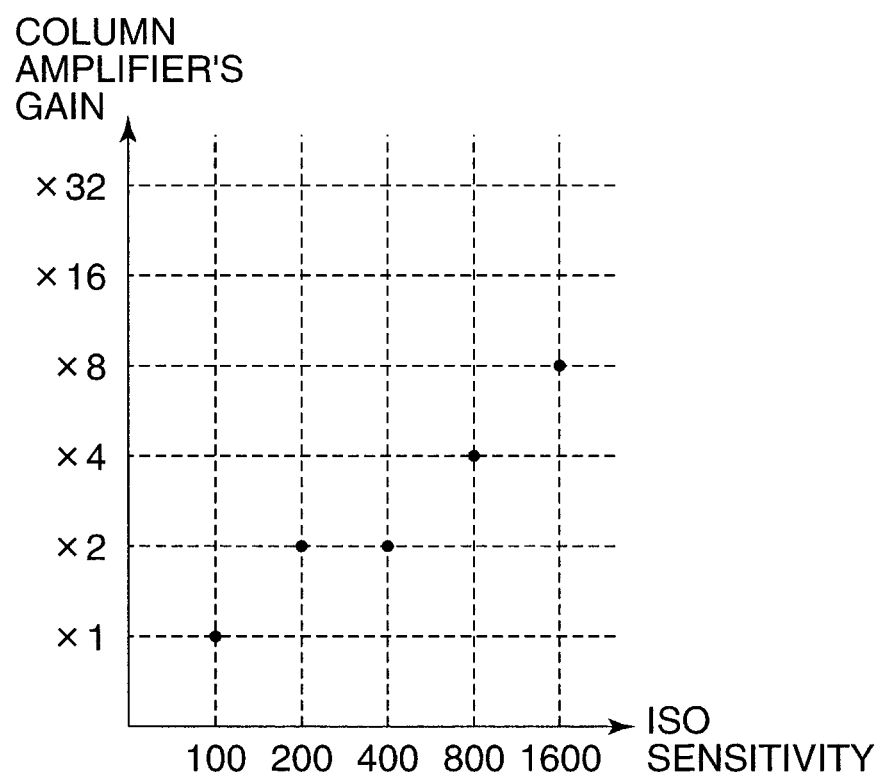
FIG. 13 is a view showing a relation between image shooting sensitivity and column amplifier's gain at moving image shooting in high speed mode.

FIG. 13 shows a relation between the image shooting sensitivity and the gain of each of column amplifiers 23a, 23b at moving image shooting in high speed mode.

In a case that the low ISO sensitivity (ISO 100 or ISO 200) is selected at moving image shooting in high speed mode, a readout operation is performed while capacity components connected to pixel amplifiers 7 are each increased to a value of "2C" which is two times as large as the capacity "C" of the FD 9, as described above. Accordingly, the gain of each pixel amplifier 7 decreases to one-half of that attained when the capacity component is equal to the value "C".

As shown in FIG. 13, when the image shooting sensitivity is ISO 100 or ISO 200, each column amplifier provides the 1-time or 2-times gain in this embodiment. On the other hand, when the image shooting sensitivity is ISO 400, ISO 800 or ISO 1600, each column amplifier provides the 2-times, 4-times or 8-times gain. As a result, at the ISO 100, ISO 200, ISO 400, ISO 800, and ISO 1600, the total gain of the pixel amplifier and column amplifier at the readout operation becomes ½-times, 1-time, 1-time, 2-times and 4-times gains, respectively.

As described above, in accordance with the image shooting mode (still image shooting or moving image shooting) and the image shooting condition (image shooting sensitivity and high image quality mode or high speed mode), the capacity components connected to pixel amplifiers are changed by selectively connecting the pixel amplifiers to the corresponding connection lines, and the gains of column amplifiers are also changed, whereby the total gain of the pixel amplifier and the column amplifier at the same ISO sensitivity can be kept at substantially the same irrespective of the image shooting mode.

In the case of high sensitivity still image shooting, noise can be reduced by setting the gain to be small.

It should be noted that in the second embodiment, the gains of column amplifiers are set according to capacity components connected to the pixel amplifiers, but this is not limitative. For example, a gain in the image sensing device (other than the column amplifier's gain) or a gain in a device other than the image sensing device (such as the AFE and the image processing unit) can be set according to capacity components connected to pixel amplifiers.

As apparent from the foregoing description, the connection switches 37a to 37l and the connection lines 38a to 38d constitute a switch unit of this invention defined in the appended claims, and the CPU 104, the timing generator 102, and the vertical scanning circuit 35 function as a control unit of this invention.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2011-159924, filed Jul. 21, 2011, and No. 2012-120584, filed May 28, 2012, which are hereby incorporated by reference herein in their entirety.

What is claimed is:

1. An image pickup apparatus comprising:
an image sensing device that includes a plurality of pixels arranged two-dimensionally, a plurality of floating diffusion units provided respectively corresponding to the plurality of pixels and configured to convert electrical charges respectively generated in the plurality of pixels into voltage signals, and a switch unit configured to selectively connect or disconnect at least one of the plurality of floating diffusion units to or from connection lines; and
a control unit configured to control said switch unit in such a manner that at least parts of the plurality of floating diffusion units are connected to the connection lines in order to increase a capacity of the plurality of floating diffusion units, and to control said switch unit in such a manner that the plurality of floating diffusion units are connected to one another via the connection lines in order to mix the electrical charges respectively generated in the plurality of pixels.

2. The image pickup apparatus according to claim 1, wherein the plurality of floating diffusion units include plural sets of floating diffusion units arranged in a same column, and said switch unit includes connection switches arranged respectively corresponding to the plurality of pixels.

3. The image pickup apparatus according to claim 2, wherein said control unit is operable in a first readout mode where all the connection switches corresponding to each of the plural sets of pixels are turned off or in a second readout mode where parts of the connection switches are turned on.

4. The image pickup apparatus according to claim 3, wherein in the second readout mode, said control unit turns on those ones of the connection switches which correspond to readout object pixels.

5. The image pickup apparatus according to claim 3, wherein said control unit operates in the first readout mode in a case where the image shooting condition represents a high image shooting sensitivity, and operates in the second readout mode in a case where the image shooting condition represents a low image shooting sensitivity.

6. The image pickup apparatus according to claim 3, wherein said control unit operates in the first readout mode in a case where the image shooting condition represents a low brightness, and operates in the second readout mode in a case where the image shooting condition represents a high brightness.

7. The image pickup apparatus according to claim 3, wherein said control unit operates in the second readout mode in a case where the image shooting condition represents a still image shooting mode.

8. The image pickup apparatus according to claim 3, wherein the plurality of pixels include plural sets of pixels arranged in a same column,
said control unit is operable in a third readout mode where all the connection switches corresponding to each of the plural sets of pixels are turned on,
said control unit operates in the first readout mode or in the second readout mode in a case where thinning readout is performed for each of the plural sets of pixels, and
said control unit operates in the third readout mode in a case where addition readout is performed for each of the plural sets of pixels.

9. The image pickup apparatus according to claim 8, wherein at moving image shooting, said control unit makes a changeover between the first or second readout mode and the third readout mode according to a frame rate.

10. The image pickup apparatus according to claim 3, wherein said image sensing device further includes amplification units configured to respectively amplify the voltage signals that are converted from electrical charges generated in the plurality of pixels, and
said control unit changes gains of the amplification units according to which of the first and second readout modes in which said control unit operates.

11. The image pickup apparatus according to claim 1, wherein the control unit controls said switch unit based on the image shooting condition, and the image shooting condition includes at least one of an image shooting sensitivity and an image shooting mode that represents still image shooting or moving image shooting.

12. A control method for an image pickup apparatus having an image sensing device that includes a plurality of pixels arranged two-dimensionally, a plurality of floating diffusion units provided respectively corresponding to the plurality of pixels and configured to convert electrical charges respectively generated in the plurality of pixels into voltage signals, and a switch unit connection lines configured to selectively connect or disconnect at least one of the plurality of floating diffusion units to or from, comprising:
a step of controlling the switch unit in such a manner that at least parts of the plurality of floating diffusion units are connected to the connection lines in order to increase a capacity of the plurality of floating diffusion units, and of controlling said switch unit in such a manner that the plurality of floating diffusion units are connected to one another via the connection lines in order to mix the electrical charges respectively generated in the plurality of pixels.

* * * * *